(12) United States Patent
Zawacki et al.

(10) Patent No.: US 10,744,836 B2
(45) Date of Patent: Aug. 18, 2020

(54) COMPOSITE SUSPENSION COMPONENTS

(71) Applicant: Hendrickson USA, L.L.C., Itasca, IL (US)

(72) Inventors: Jeffrey R. Zawacki, Channahon, IL (US); Michael J. Keeler, Naperville, IL (US); Scott Allen Massa, Chicago, IL (US); Dmitriy Enrikovich Rubalskiy, Bolingbrook, IL (US)

(73) Assignee: Hendrickson USA, L.L.C., Itasca, IL (US)

( * ) Notice: Subject to any disclaimer, the term of this patent is extended or adjusted under 35 U.S.C. 154(b) by 0 days.

(21) Appl. No.: 15/739,640

(22) PCT Filed: Jun. 21, 2016

(86) PCT No.: PCT/US2016/038525
§ 371 (c)(1),
(2) Date: Dec. 22, 2017

(87) PCT Pub. No.: WO2016/209815
PCT Pub. Date: Dec. 29, 2016

(65) Prior Publication Data
US 2018/0178608 A1    Jun. 28, 2018

Related U.S. Application Data

(60) Provisional application No. 62/183,043, filed on Jun. 22, 2015.

(51) Int. Cl.
*B60G 11/12* (2006.01)
*F16F 1/368* (2006.01)

(52) U.S. Cl.
CPC .......... *B60G 11/12* (2013.01); *F16F 1/3686* (2013.01); *B60G 2204/121* (2013.01);
(Continued)

(58) Field of Classification Search
CPC ............... F16F 2226/04; F16F 1/3686; F16F 2230/0035; F16F 1/368; B60G 2206/7101;
(Continued)

(56) References Cited

U.S. PATENT DOCUMENTS 4,414,049 A    11/1983  Jones
4,505,460 A *  3/1985  Le Gallais ............. B60G 11/12
                                                        267/149
(Continued)

FOREIGN PATENT DOCUMENTS

DE          3928855 A1 *  3/1991  ......... B29C 45/0005
DE    102017221235 A1 *  5/2019  ........... B29C 70/222
(Continued)

OTHER PUBLICATIONS

International Search Report dated Jun. 16, 2016 for International Application No. PCT/US2016/038525.
(Continued)

*Primary Examiner* — Xuan Lan Nguyen
(74) *Attorney, Agent, or Firm* — Cook Alex Ltd.

(57) ABSTRACT

Composite suspension components are disclosed. The components are made from resin containing elongated fibers (8). The arms of the suspension components may receive reinforcement (40) using different devices and methods. A composite torque rod also incorporates a tunable compliance feature.

52 Claims, 15 Drawing Sheets

(52) U.S. Cl.
CPC .... *B60G 2204/43* (2013.01); *B60G 2206/428* (2013.01); *B60G 2206/7101* (2013.01); *F16F 2226/04* (2013.01); *F16F 2230/0035* (2013.01)

(58) Field of Classification Search
CPC .............. B60G 11/12; B60G 2204/121; B60G 2204/43; B60G 2206/428
See application file for complete search history.

(56) References Cited

U.S. PATENT DOCUMENTS

| | | | |
|---|---|---|---|
| 4,749,534 | A | 6/1988 | Robertson |
| 6,113,058 | A * | 9/2000 | Iwasaki ................... B60G 7/001 248/678 |
| 6,619,637 | B1 * | 9/2003 | Juriga .................... B60G 11/12 267/262 |
| 9,194,451 | B2 | 11/2015 | Voigt et al. |
| 2002/0149190 | A1 | 10/2002 | Bradley et al. |
| 2008/0128968 | A1 * | 6/2008 | Platner ................... B60G 11/04 267/260 |
| 2015/0151605 | A1 * | 6/2015 | Kuroda ............. B60G 21/0551 280/124.107 |

FOREIGN PATENT DOCUMENTS

| | | | |
|---|---|---|---|
| EP | 0215365 | A2 | 3/1987 |
| EP | 0477084 | A1 * | 3/1992 ............ B60G 11/10 |
| FR | 2 587 649 | A1 | 3/1987 |
| GB | 2 147 972 | A | 5/1985 |
| JP | S56 141434 | A | 11/1981 |
| JP | S56 147934 | A | 11/1981 |
| JP | S57 124141 | A | 8/1982 |
| JP | S58 118338 | A | 7/1983 |
| JP | S58 142044 | A | 8/1983 |
| JP | S58 166148 | A | 10/1983 |
| WO | WO 85/03988 | A | 9/1985 |

OTHER PUBLICATIONS

Written Opinion of the International Searching Authority dated Jun. 16, 2016 for International Application No. PCT/US2016/038525.
Office Action Issued by the China National Intellectual Property Administration for Application No. 201680045795.5, dated Apr. 4, 2019 with English Translation (16 pages).

* cited by examiner

COMPOSITE SUSPENSION COMPONENTS

CROSS-REFERENCE TO RELATED APPLICATIONS

This patent application is a U.S. national phase application of PCT International Application No. PCT/US2016/038525, filed Jun. 21, 2016, which claims prior to and the benefit of U.S. Provisional Application Ser. No. 62/183,043, filed Jun. 22, 2015, all of which are incorporated herein by reference in their entireties.

BACKGROUND OF THE INVENTION

Field of the Disclosure

The present subject matter relates generally to composite linkage technology in the automotive field and more particularly to composite linkage components in suspensions for heavy duty vehicles.

Composite linkage technology has found application in the automotive industry for some time, however, the scope of its use has been somewhat limited for several reasons.

Composite materials are generally anisotropic. Therefore, their mechanical and other physical properties vary with direction. Isotropic materials, such as aluminum or steel, have uniform properties in all directions, and therefore, will exhibit the same stiffness regardless of the orientation of the applied force and/or moments.

Composite materials also have some disadvantages when heavy and complex stress applications are involved, such as with suspension linkages. As one example, leaf springs must handle both tensile and compressive forces operating in separate, parallel planes. These stresses create a third form of stress, laminar shear, which imposes significant stresses at the ends of the spring in the eyes. As another example, a torque rod must handle intense compressive, tensile and torsional forces which operate along its longitudinal axis. Compressive forces directed into the linkage also create tensile shear in the arm of the torque rod.

One approach to these problems has been to limit the use of composite materials to less demanding applications. Another approach has been to develop more advanced composite materials for certain applications. However, these advancements are limited in their application and involve substantial investment in time and expense to manufacture.

Other responses include bolting an aluminum or steel eye on the end of a composite linkage, such as a composite leaf spring arm (FIG. A.). This approach adds to cost and weight of a secondary component and the associated joining hardware to connect a metal eye to a composite structure, Accordingly, it is desirable to overcome one or more of these challenges and/or shortcomings in the economical and efficient design, manufacture and use of composite suspension linkage components, particularly for heavy duty vehicles.

SUMMARY OF THE INVENTION

There are several aspects of the present subject matter which may be embodied separately or together in the devices and systems described and claimed herein. These aspects may be employed alone or in combination with other aspects of the subject matter, and the description of these aspects together is not intended to preclude the use of these aspects separately or the claiming of such aspects separately as set forth in the claims appended hereto.

In one aspect of this disclosure, a vehicle suspension component comprises a first arm and a first eye, each having a first portion and a second portion. The first arm and first eye are connected and formed of a resin containing a plurality of elongated fibers. The resin and plurality of elongated fibers extend through the first portion of the first arm into a first portion of the first eye, and through a second portion of the first arm into a second portion of the first eye. The first and second portions of the first arm are joined together to form a bond between them. A fastener associated with the first arm connects the first and second portions of the first arm together to reinforce the bond between said them or to resist their separation from one another.

In a second aspect of this disclosure, a vehicle suspension component comprises a first eye, an arm and a second eye, each having a first portion and a second portion. The arm is connected to the first and second eye and all are formed of a resin containing a plurality of elongated fibers. The resin and plurality of elongated fibers extends through a first portion of the arm into a first portion of the first eye and through a first portion of the arm into a first portion of the second eye, through a second portion of said arm into a second portion of the first eye and through a second portion of the arm into a second portion of the second eye. The first and second portions of the arm are joined together to form a bond. The arm further comprises a first exterior surface defining an opening in the suspension component arm.

BRIEF DESCRIPTION OF THE DRAWINGS

In describing the preferred examples, reference is made to the accompanying drawing figures wherein like parts have like reference numerals, and wherein.

DETAILED DESCRIPTION

The embodiments disclosed herein are for the purpose of providing a description of the present subject matter, and it is understood that the subject matter may be embodied in various other forms and combinations not shown in detail. Therefore, specific designs and features disclosed herein are not to be interpreted as limiting the subject matter as defined in the accompanying claims.

As used herein, the terms X axis or X direction, Y axis or Y direction and Z axis or Z direction, shall be understood in relation to the suspension component or the feature or part thereof to which it pertains. Accordingly, the X axis or direction means the axis or direction which is parallel to the longitudinal axis of the suspension component arm adjacent the eye. The Y axis or direction means the axis or direction which is perpendicular to the X axis or direction and parallel to the central axis of the nearest eye. The Z axis or direction means the axis or direction which is perpendicular to the X or longitudinal axis of the suspension component arm adjacent the eye and perpendicular to the central axis of the nearest eye.

The term Z axis reinforcement refers to the methods and structures as contemplated by the present disclosure for applying, directly or indirectly, or for delivering, inwardly directed, opposing forces, to a suspension component arm or the constituent elements of the arm, along an axis generally parallel to the Z axis of the suspension component.

Figure 1:
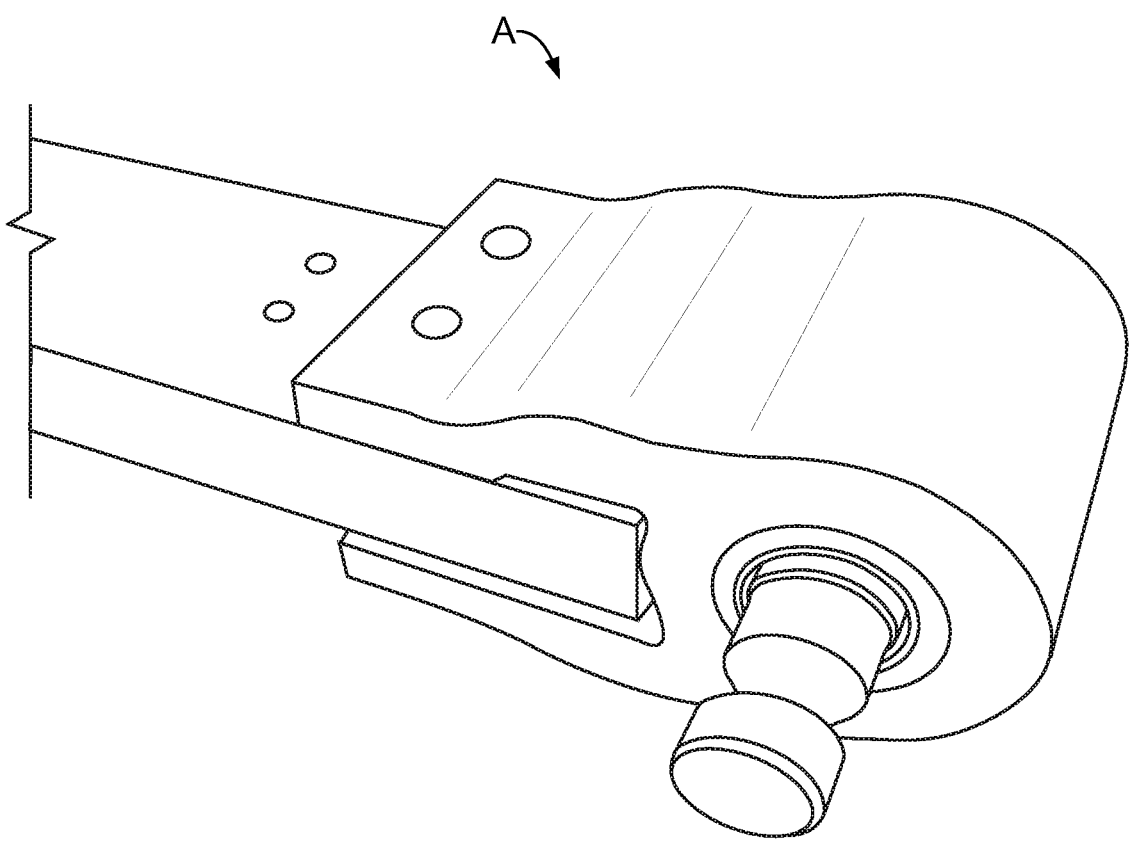
FIG. 1 is a perspective view of a portion of a prior art composite leaf spring with a bolt on eye.
Figure 2:
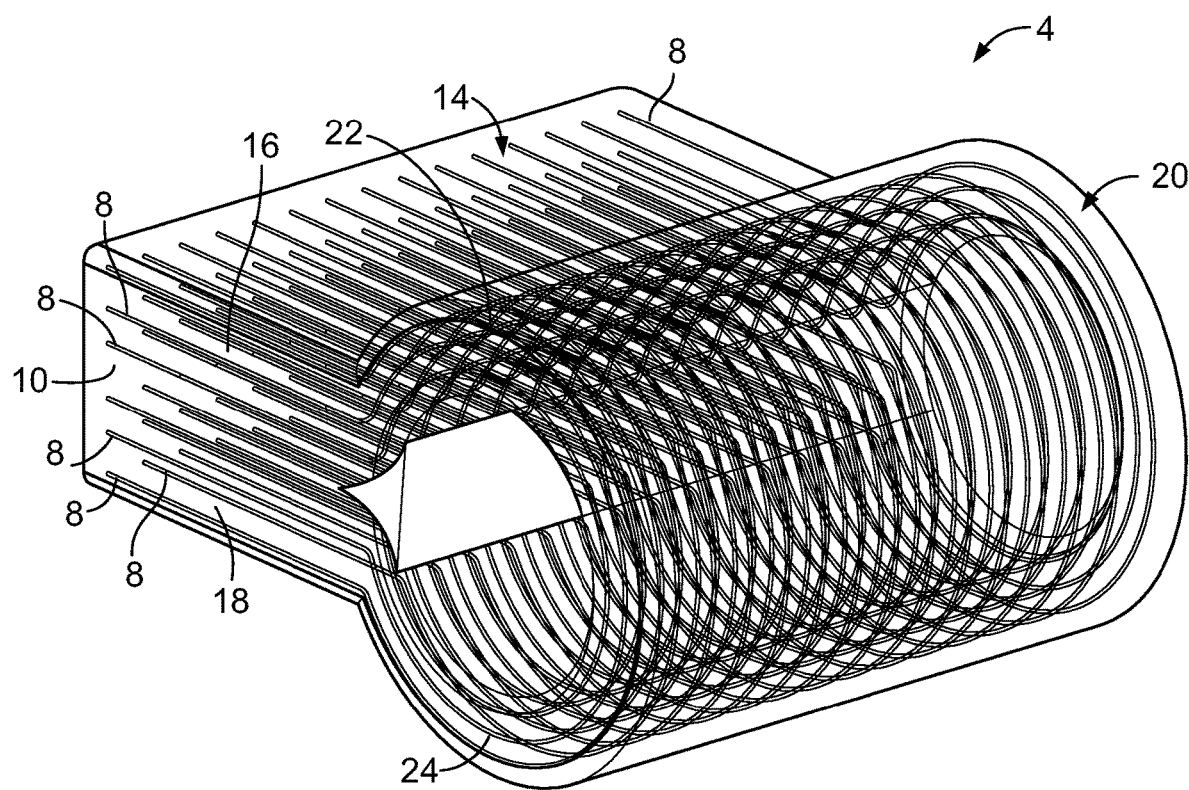
FIG. 2 is a schematic, perspective view of a portion of a composite suspension component containing elongated fibers.
Figure 3:
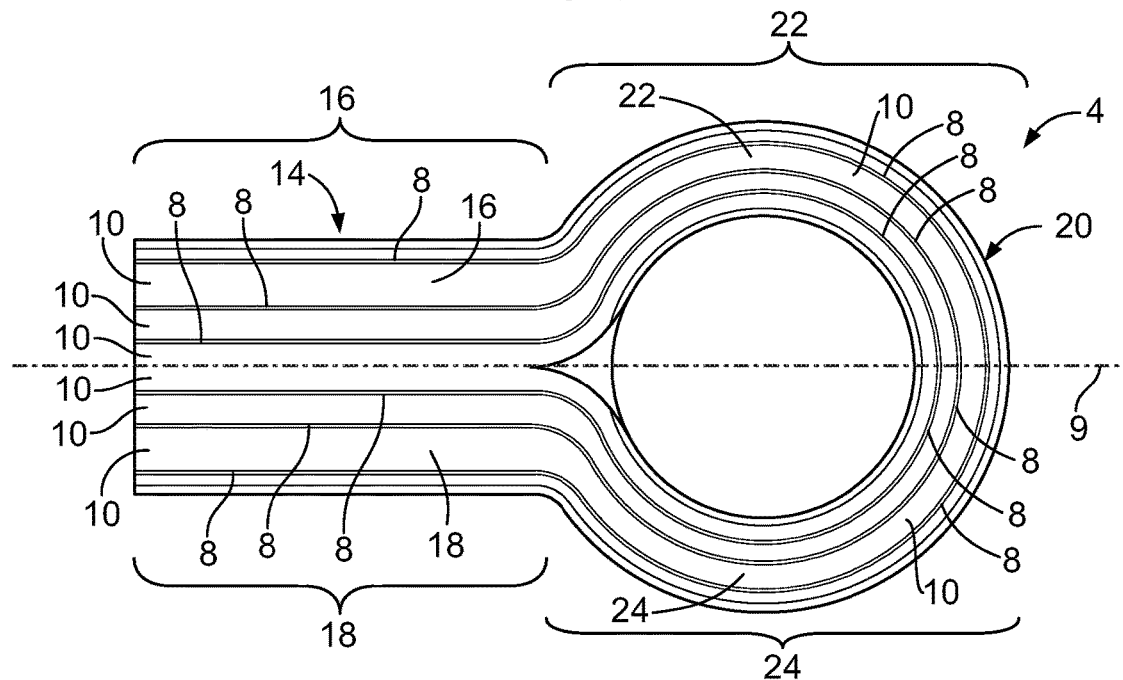
FIG. 3 is a schematic, side elevational view of the suspension component shown in FIG. 2.

FIGS. 2 and 3 schematically illustrate a portion of an example composite suspension component 4 which may receive Z axis reinforcement as contemplated by the present disclosure. The example composite suspension component 4 (FIGS. 2-3) can be manufactured in a number of ways consistent with the present disclosure. In one example method, elongated glass, carbon, or other structural fibers are uniformly wet by being pulled through a resin bath. The wetted fiber is then wound about a single pin or two pins, depending on whether a single or double hub or eye is desired. Preferably, pin diameter is selected based on the desired inner diameter of the corresponding finished eye. The wetted fiber hank is then placed into a mold that is cut to the desired outer shape of the part being produced. The mold cavity is then filled with a suitable resin polymer which, in the present disclosure, may be thermoset or thermoplastic in nature, and is an epoxy in a preferred embodiment. Excess resin is expressed from the mold. The resin containing the elongated fibers then solidifies and is cured.

Example composite suspension component 4 (FIGS. 2-3), which may receive Z axis reinforcement according to the present disclosure is made of resin containing elongated fibers 8 which are generally continuous, generally unidirectional and/or generally parallel. The fiber to resin volume ratio of such an example composite suspension component may be approximately 50%. The fiber weight fraction may range from 60 to 85% and fall within the upper half of this range in the eyes. Composite resin containing elongated fibers extend through a first portion 16 and a second portion 18 of a first arm 14 of the suspension component into respectively, a first portion (first branch) 22 and a second portion (second branch) 24 of a first eye 20. In the example suspension component, the connection at the interface 9 between the first and second portions 16, 18 of the first arm 14 depends primarily on the bond strength of the resin 8 rather than the strength of the elongated fibers 8.

Z axis reinforcement as contemplated by the present disclosure can be applied, directly or indirectly at, or delivered to, any location along the X axis of arm 14. If reinforcement of an integrated eye is desired, particularly to resist opening of the eye, it may be preferable to apply Z axis reinforcement at the arm 14 adjacent the eye along a cross section extending in the Z direction, for example, at or near where the first and second portions 16, 18 or their respective elongated fibers diverge to form eye 20.

One form of Z axis reinforcement, as described and illustrated herein, is by stitching the elongated fibers 8 with a separate fiber or fibers. The stitching of the present disclosure generally can be performed before, during or after winding of the elongated fibers, and whether the elongated fibers are dry or wet. It will be appreciated that if elongated fibers are stitched when dry, it may be preferable to use Resin Transfer Molding (RTM), a process known to those skilled in the art of the present disclosure, to process the wound, stitched fibers through to completion of the molded part. The stitching fiber used may be glass, carbon or other flexible structural fiber and may be of the same or a different composition than that of the elongated fibers. Stitching can be performed manually, however, it is also amenable to being performed with an industrial sewing or stitching machine.

FIGS. 4A-7B illustrate four example stitching patterns that may be utilized according to the present disclosure, to provide reinforcement to a suspension component, such as, for example, a leaf spring or torque rod, having an integrated eye and constructed from resin containing elongated fibers. The example stitching patterns extend in the Z and Y directions. The example stitches of these patterns bundle, individually and/or collectively, elongated fibers in first and second portions 16, 18 of arm 14. The illustrated stitches and stitching patterns are merely examples and differently shaped stitches and stitching patterns may be employed without departing from the scope of the present disclosure.

Figure 4A:
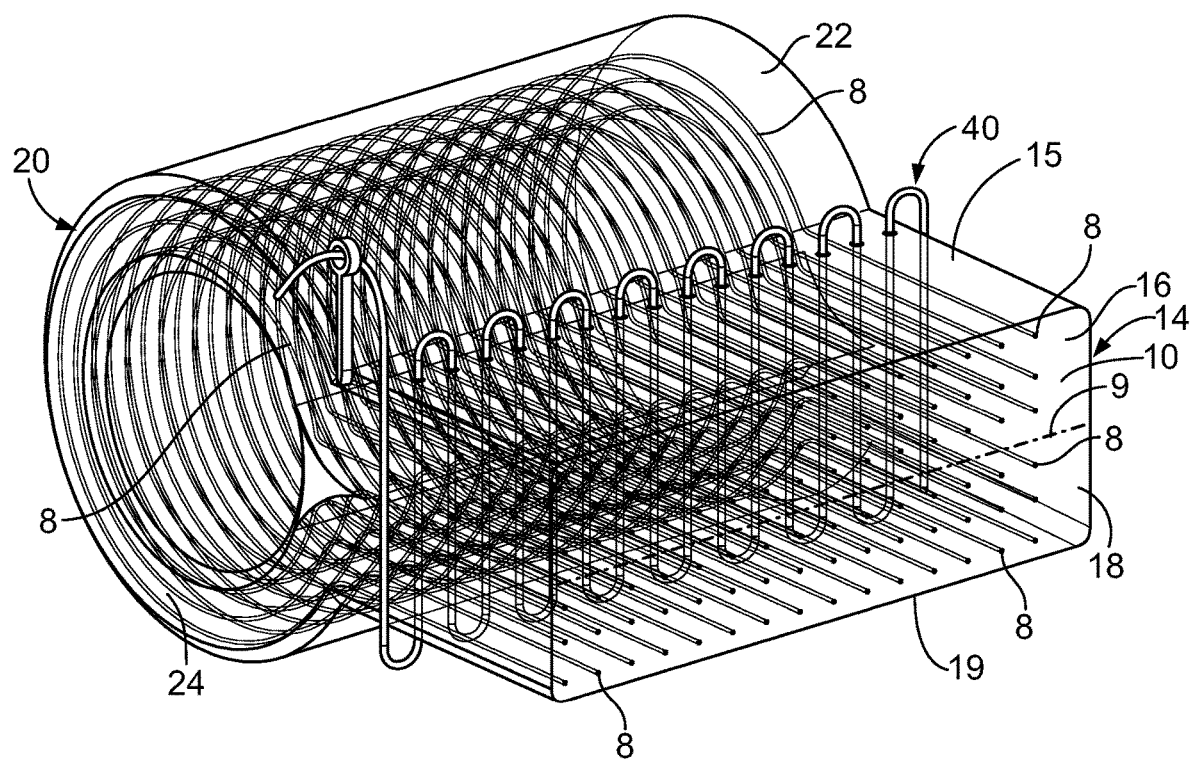
FIG. 4A is a schematic, perspective view of a portion of a suspension component according to an aspect of the present disclosure.
Figure 4B:
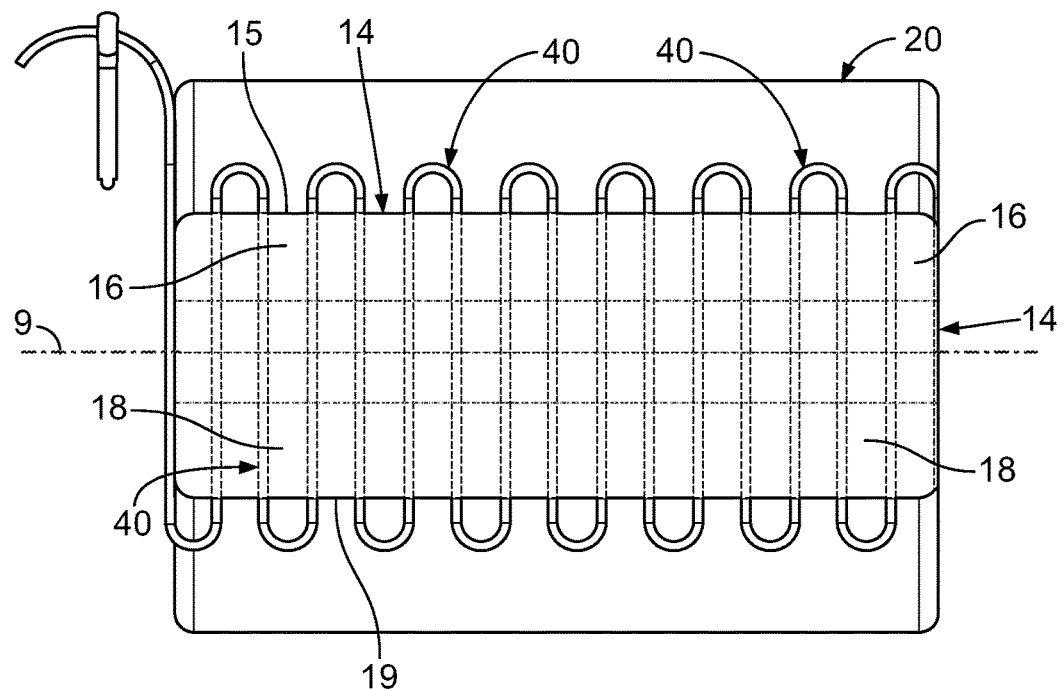
FIG. 4B is a schematic, cross sectional view of a portion of the embodiment shown in FIG. 4A.

FIGS. 4A and 4B schematically illustrate a first example stitching pattern. Example stitching pattern 40 is generally wavelike in nature, sweeping back and forth across interface 9. While the path of stitching pattern 40 can be described from any point of intersection with interface 9, it is arbitrarily described herein from a location along interface 9 just prior to traveling into the upper collection of wound, elongated fibers 8 that, when manufacturing is completed, will form part of first portion 16 of arm 14.

Example stitching pattern 40 extends generally in the Z direction, away from interface 9. Preferably, the stitch of pattern 40 generally extends in the Z direction until it has traveled above a substantial number of the elongated fibers that are above interface 9. The stitch of example pattern 40 then turns around, extending generally in the Y direction along a path, which in FIG. 4B is generally semicircular but could be any shape, such as for example, angular, elliptical, straight or square. The stitch of pattern 40 then extends back generally in the Z direction, crosses interface 9, and continues until it has traveled below a substantial number of fibers that are below interface 9. The stitch of pattern 40 then turns around, extending generally in the Y direction along a path, which in FIG. 4B is generally semicircular but as referred to above, could be any one of a number of shapes. The stitch of this example stitching pattern then extends back, generally in the Z direction, to interface 9. Example stitching pattern 40, as other example stitching patterns illustrated herein, can be continued across the width of the wound, elongated fibers that will be become part of the suspension component arm, or alternatively can be varied in a number of ways and/or combined with a number of alternative movements, without departing from the scope of the present disclosure.

Figure 5A:
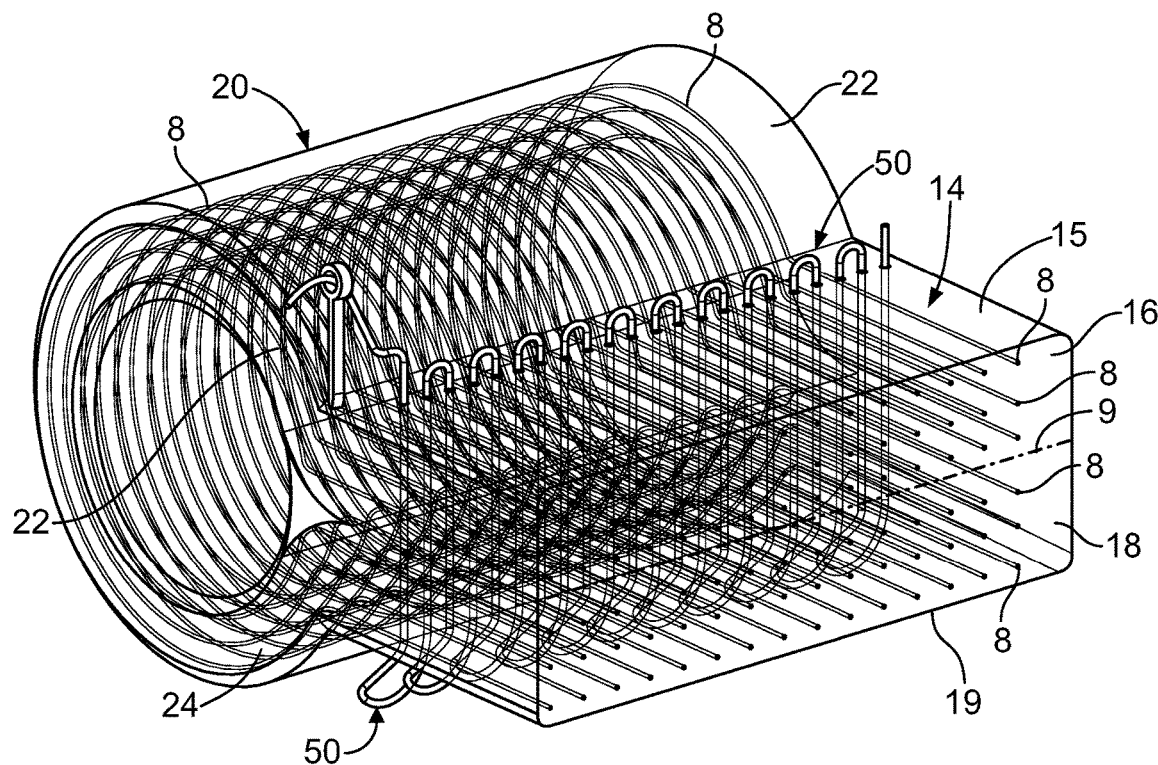
FIG. 5A is a schematic, perspective view of a portion of a suspension component according to another aspect of the present disclosure.
Figure 5B:
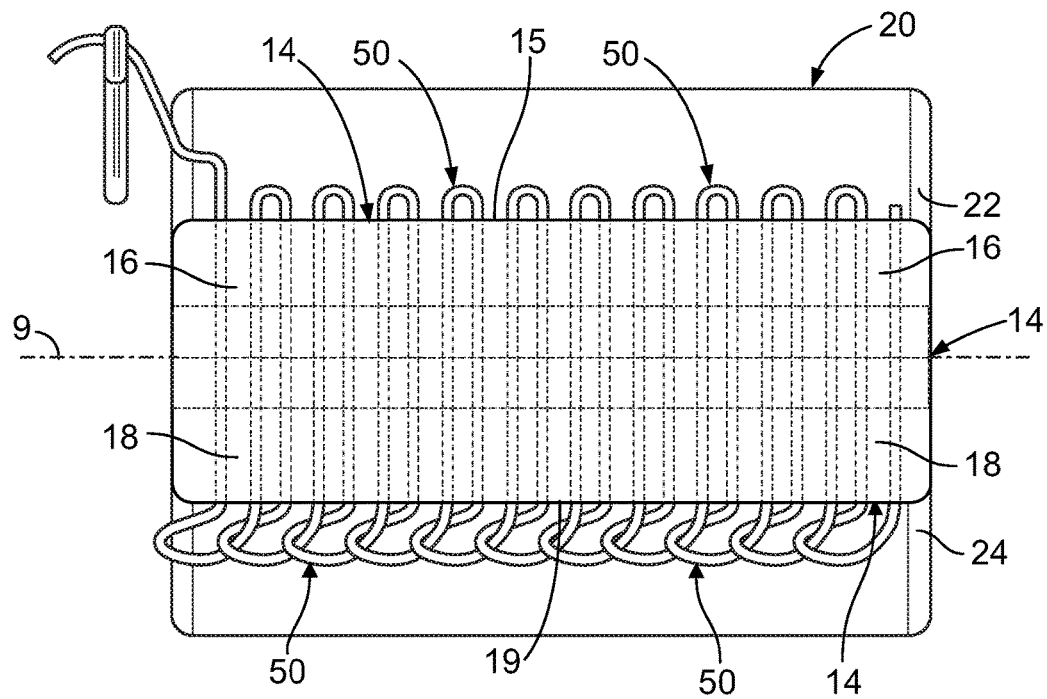
FIG. 5B is a schematic, cross sectional view of a portion of the embodiment shown in FIG. 5A.

FIGS. 5A and 5B schematically illustrate a second example stitching pattern. Second example stitching pattern 50 is similar to the first example pattern 40 in the manner in which it sweeps back and forth across interface 9. It will be appreciated however, that the degree of advancement in the Y direction with each stroke, as illustrated, is smaller than in the first example, and that on one side of interface 9 (lower portion, below interface 9 as shown in FIG. 5B), the second example stitching pattern 50 forms a loop, which a successive repetition of the stitch extends through or intersects, as the second example pattern advances in the Y direction. The intersecting loops (shown below the elongated fibers of the second portion 18 of arm 14 in FIG. 5B) can be formed above the elongated fibers of the first portion 16 of arm 14, either in addition to or in lieu of the intersecting loops shown in FIG. 5B.

Figure 6A:
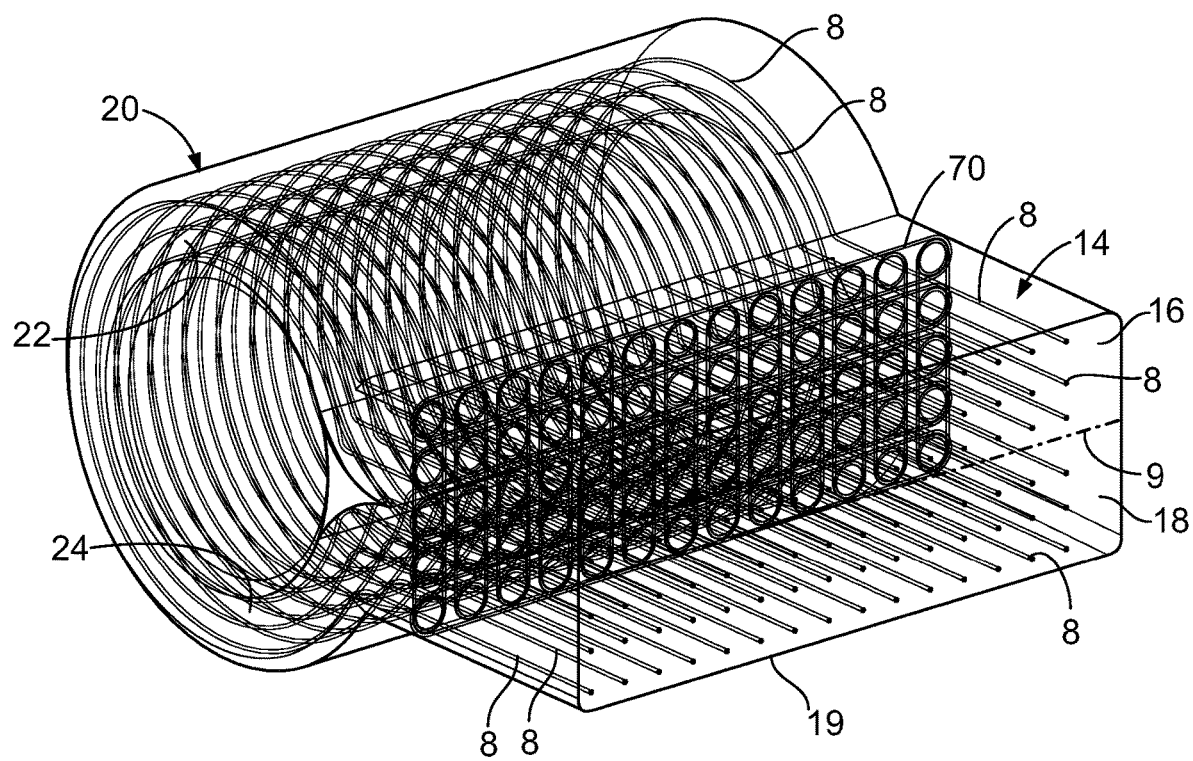
FIG. 6A is a schematic, perspective view of a portion of a suspension component according to another aspect of the present disclosure.
Figure 6B:
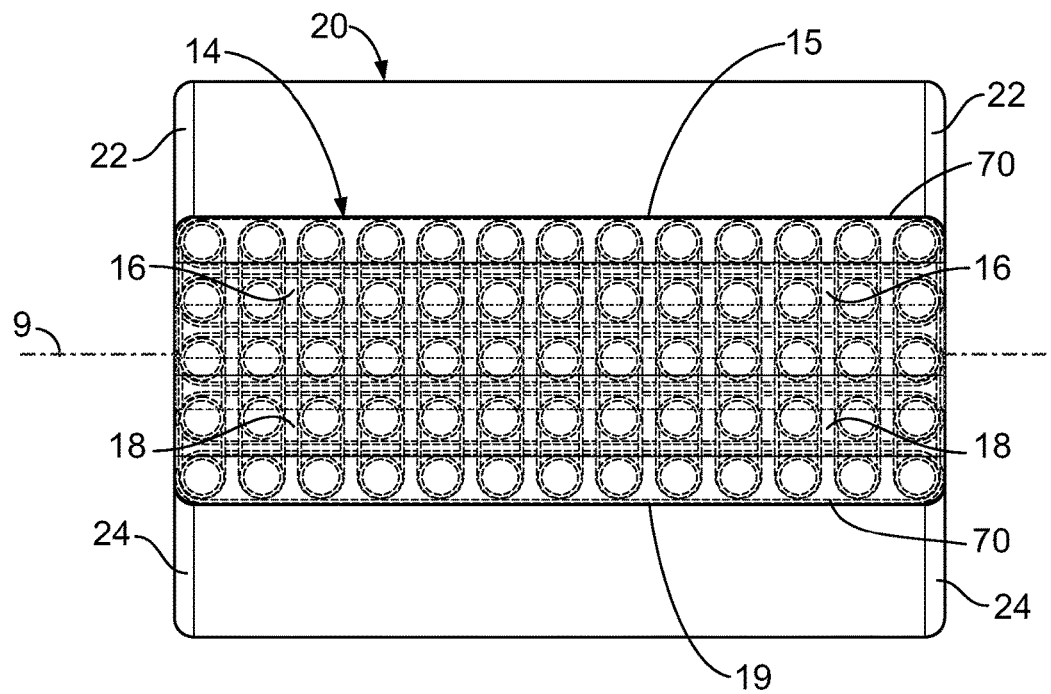
FIG. 6B is a schematic, cross sectional view of a portion of the embodiment shown in FIG. 6A.

FIGS. 6A and 6B schematically illustrate a third example stitching pattern. In a third example stitching pattern 70 (FIGS. 6A and 6B), elongated fibers of arm 14 are bundled by horizontal (Y direction) and vertical (Z direction) stitches (loops) which overlap with one another to creating a matrix or grid, extending in the Y and Z directions.

Figure 7A:
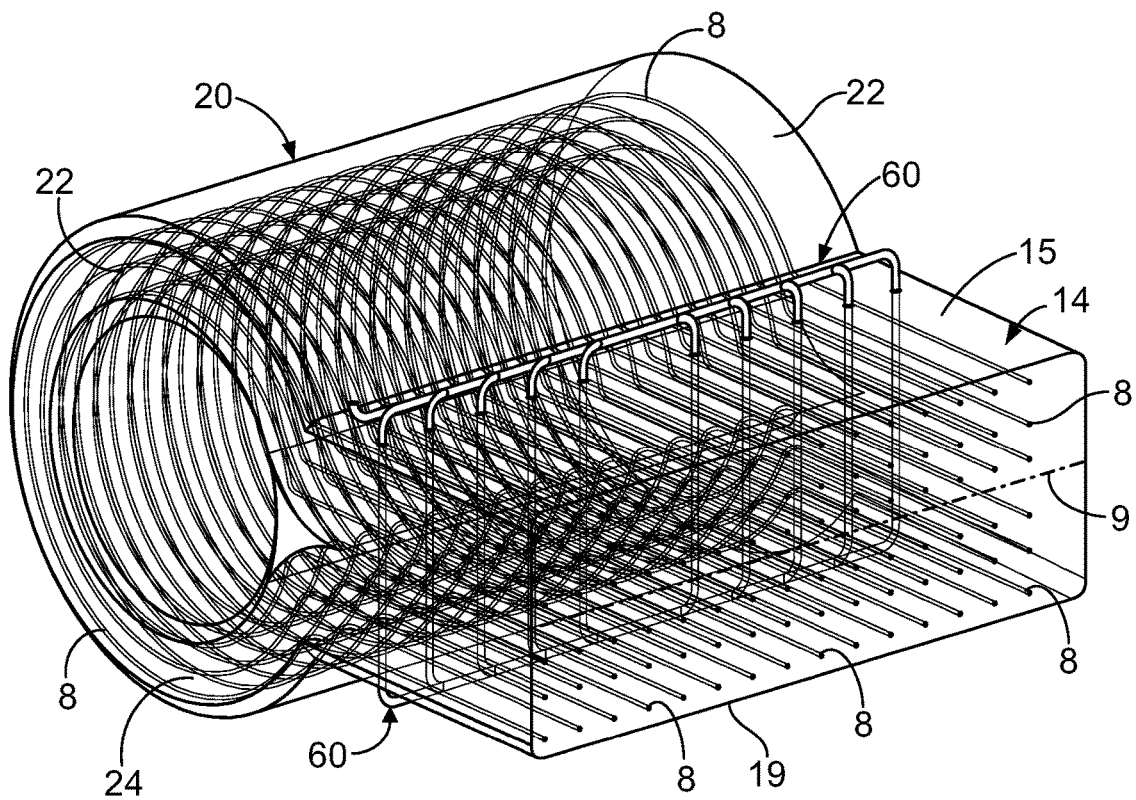
FIG. 7A is a schematic, perspective view of a portion of a suspension component according to another aspect of the present disclosure.
Figure 7B:
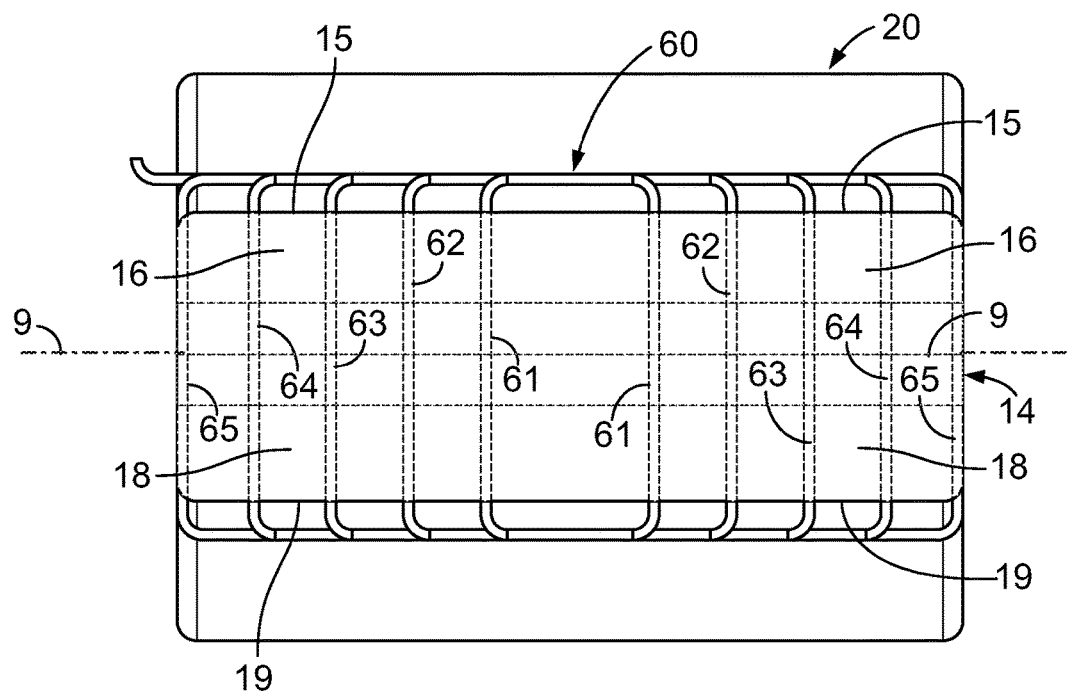
FIG. 7B is a schematic, cross sectional view of a portion of the embodiment shown in FIG. 7A.

FIGS. 7A and 7B schematically illustrate a fourth example stitching pattern. Individual loops or stitches of a fourth example stitching pattern (FIGS. 7A and 7B) bundle elongated fibers in successively larger, cross sections (61, 62, 63, 64, 65) beginning in the interior and extending outward in the Y direction. As one of many variations of the fourth example stitching pattern 60 without departing from the present disclosure, successive bundling of elongated fibers could also proceed in reverse (outside in).

It should also be noted that the stitching fibers (e.g., FIGS. 4A, 4B, 5A, 5B and 7A, 7B) may extend above and below the suspension component arm during stitching. The additional stitching fiber is preferably pulled through to remove slack either before resin is added or before the resin solidifies and is cured.

It will be appreciated that the illustrated stitches and stitching patterns are examples, which can also be varied and/or combined with other differently shaped stitches and stitching patterns, without departing from the scope of the present disclosure.

Z axis reinforcement as contemplated by the present disclosure can also be achieved through devices and methods other than stitching, such as for example opposing plates or pads, configured to engage top and bottom surfaces of a suspension component arm in the location(s) where Z axis reinforcement is desired.

FIGS. 8A thru 11B schematically illustrate application of Z axis reinforcement to the composite suspension component of FIGS. 2 and 3 using variously configured, opposing plates or pads 80 according to additional aspects of the present disclosure. Where in the previously discussed form of Z axis reinforcement a stitch or stitches were used as a fastener, in these examples, the fastener is a clamp (e.g., 79, FIGS. 8A & 8B; 79A, FIGS. 9A & 9B; 79B, FIGS. 10A & 10B; 79C, FIGS. 11A & 11B) and includes variously configured, first and second plates or pads 80 and one or more damp arms 84, which may include one or more threaded shafts or bolts 84 and corresponding nuts or connectors 86. In lieu of threaded bolts, rivets, screws and the like may also be used.

Each of the first and second plates or pads 80 are sized and configured to engage respectively a top surface 15 and a bottom surface 19 of suspension component arm 14 (FIGS. 8A-11B). First and second plate bores 82 and suspension component bores 81 are configured to receive threaded bolts 84, which when received by connector 86, apply and maintain pressure on suspension component arm 14. Any of the aspects of the present disclosure illustrated in FIGS. 8A-11B will work with a single damp arm, or bolt and connector, or may utilize additional damp arms or extensions which engage or connect with the first and second plates to apply and maintain pressure on respectively top and bottom surfaces of the suspension component arm.

Figure 8A:
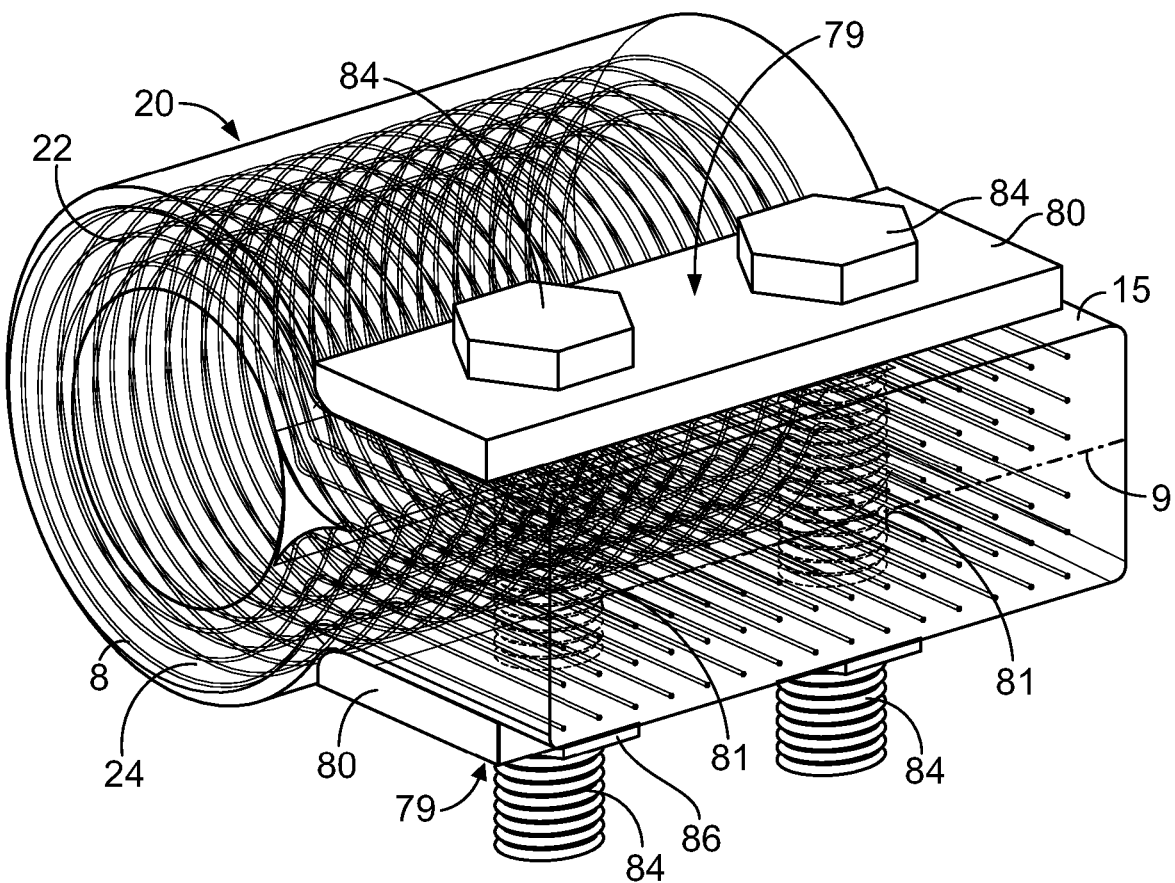
FIG. 8A is a schematic, perspective view of a portion of a suspension component according to another aspect of the present disclosure.
Figure 8B:
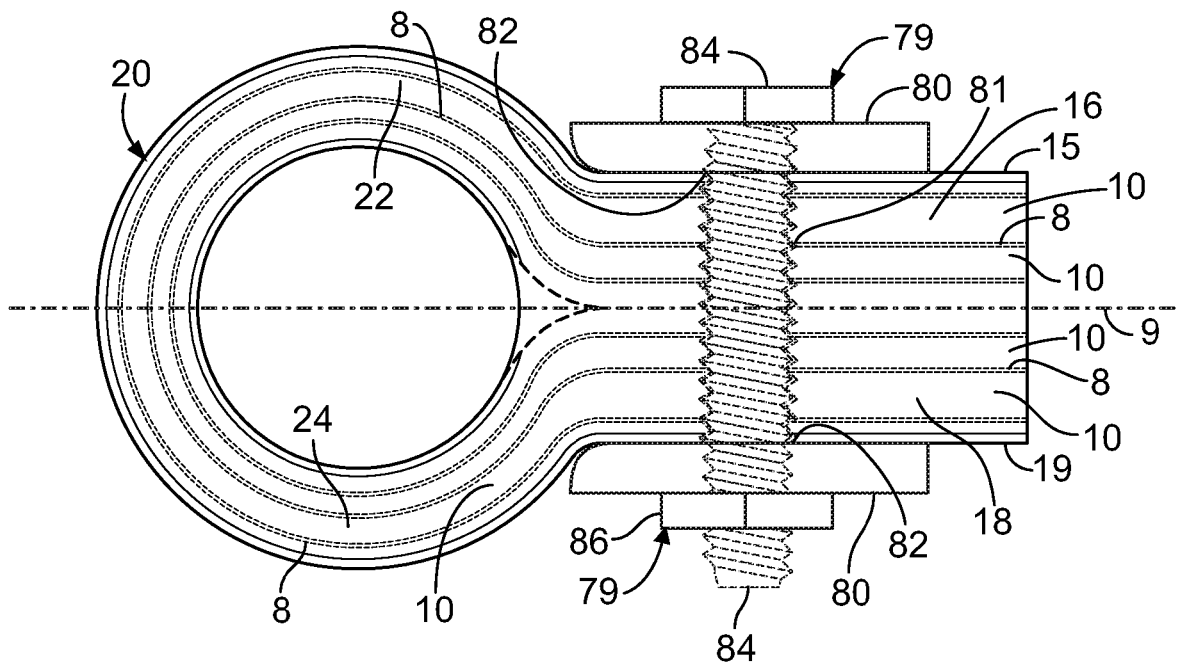
FIG. 8B is a schematic, cross sectional view of a portion of the embodiment shown in FIG. 8A.
Figure 9A:
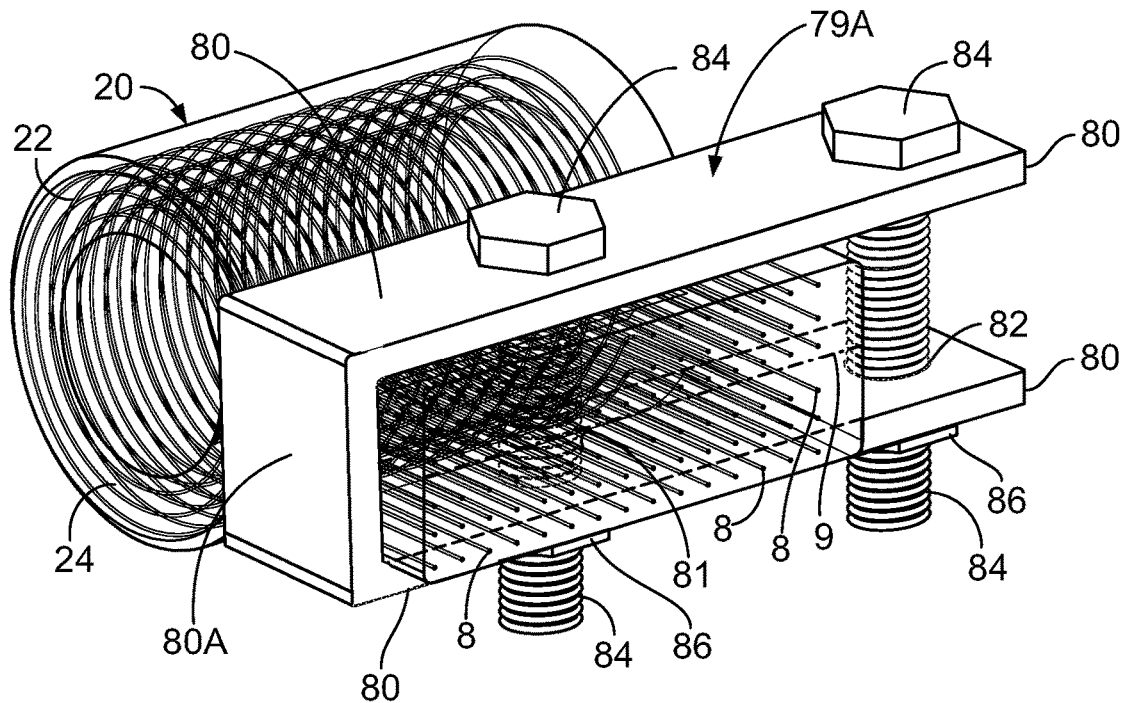
FIG. 9A is a schematic, perspective view of a portion of a suspension component according to another aspect of the present disclosure.

A clamp arm or arms may extend through a corresponding bore in the suspension component arm 14 (e.g., FIG. 8A, 8B) or around the suspension arm around a lateral edge or side of the arm (FIG. 9A).

Figure 10A:
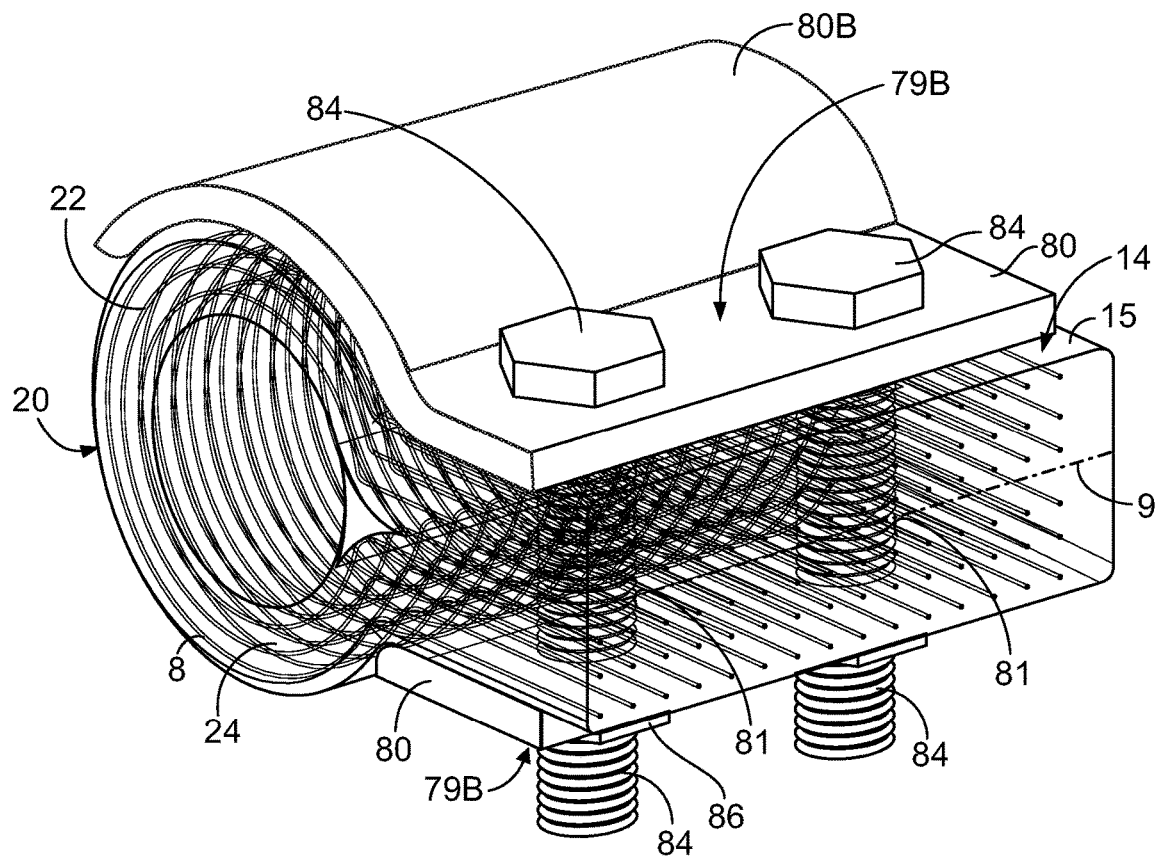
FIG. 10A is a schematic, perspective view of a portion of a suspension component according to another aspect of the present disclosure.
Figure 10B:
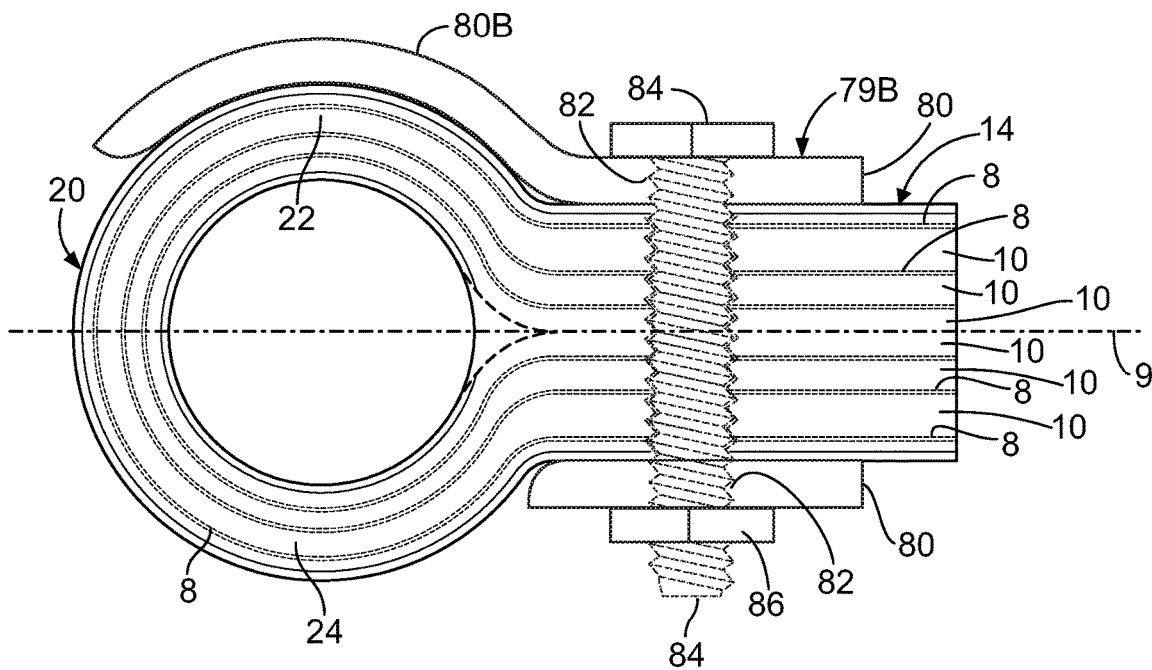
FIG. 10B is a schematic, cross sectional view of a portion of the embodiment shown in FIG. 10A.
Figure 11A:
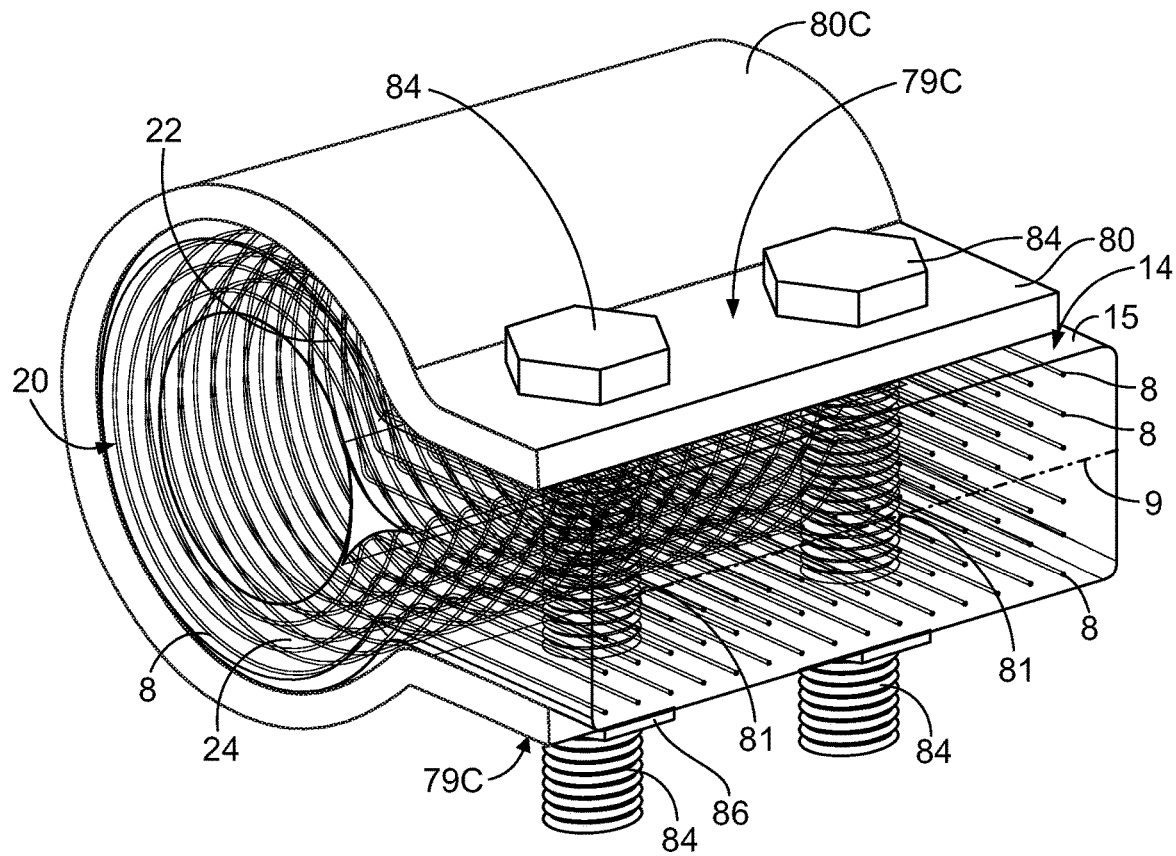
FIG. 11A is a schematic, perspective view of a portion of a suspension component according to another aspect of the present disclosure.
Figure 11B:
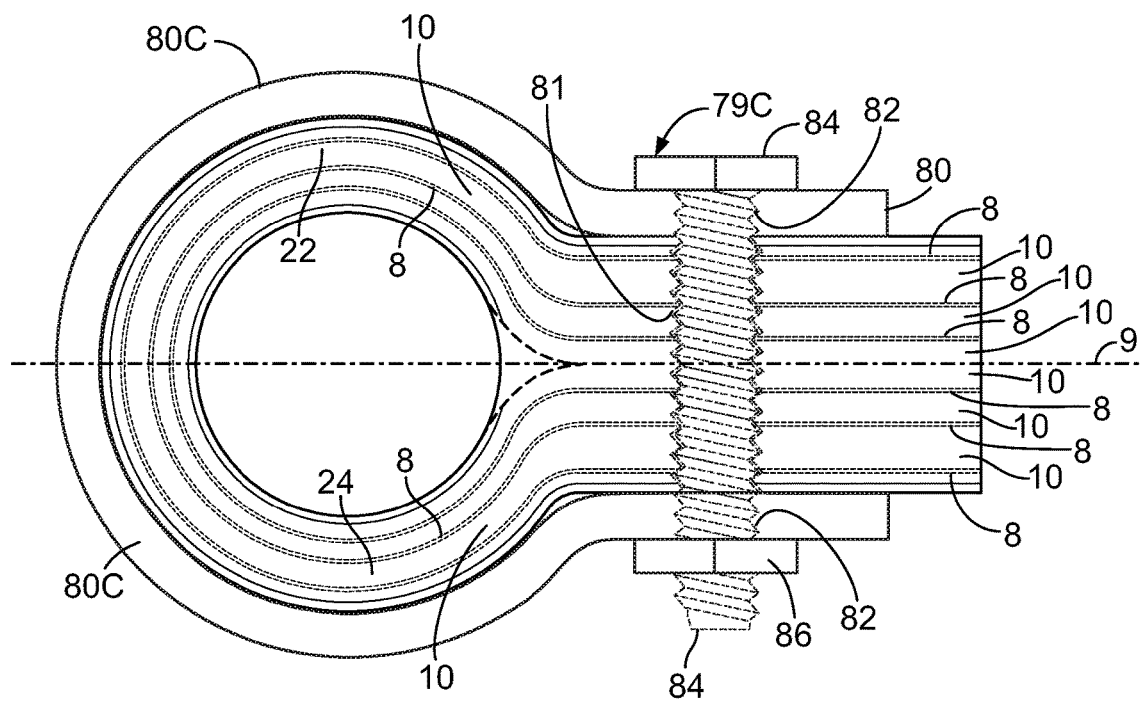
FIG. 11B is a schematic, cross sectional view of a portion of the embodiment shown in FIG. 11A.

First and second plates 80 also may be formed integrally (FIGS. 9A, 11A), or separately (FIGS. 8A, 10A). The first plate or second plate 80 may include an extension (80A, FIG. 9A; 80B, FIG. 10A; 80C, FIG. 11A) which may extend around the suspension component arm 14 around a lateral edge or side of the arm (FIG. 9A), or partially around (FIG. 10A) 80B or entirely around (FIG. 11A) 80C an outer surface of eye 20.

To reinforce an eye or to resist opening of eye 20, clamp 79 is preferably positioned adjacent the eye 20, preferably with the nearest edge of first and second plates 80 to be generally in vertical alignment at or near a location along the X axis of the suspension component arm 14 where first and second portions 16, 18 or their respective elongated fibers diverge.

Figure 12A:
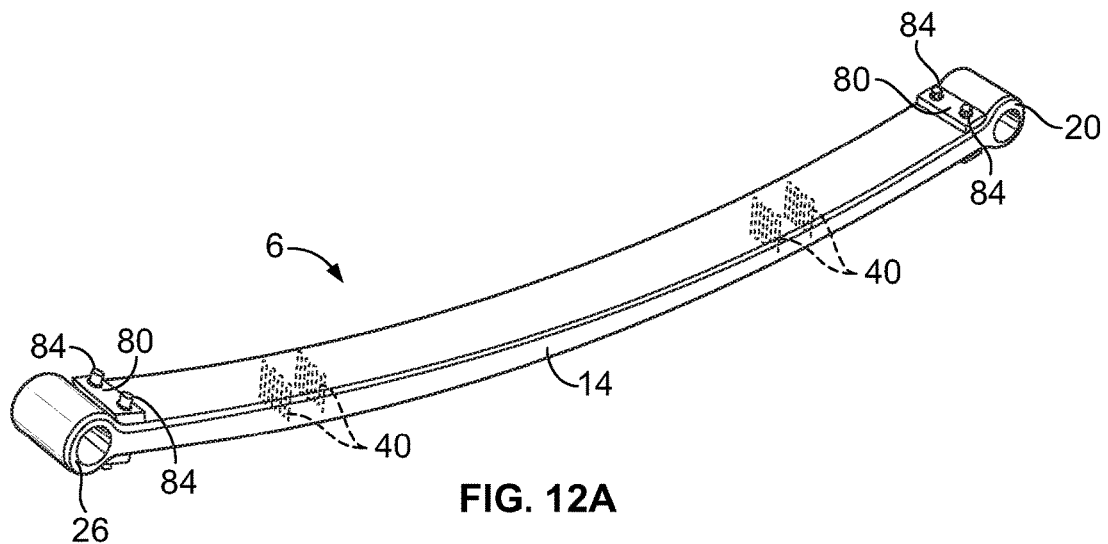
FIG. 12A is a perspective view of leaf spring incorporating aspects of the present disclosure.
Figure 12B:
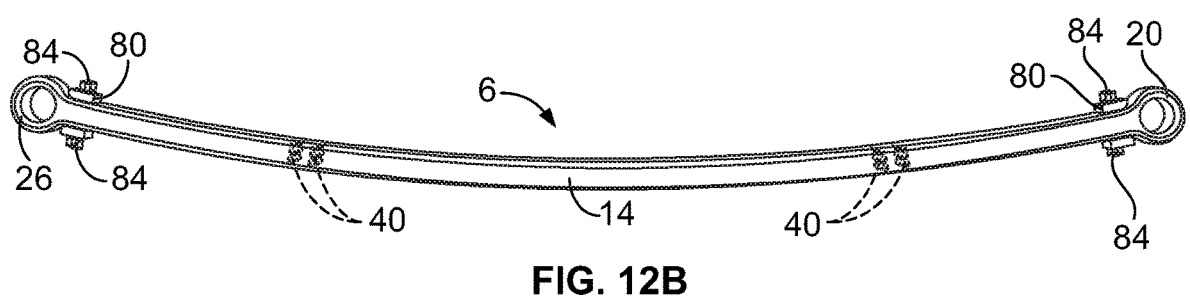
FIG. 12B is a side elevational view of the embodiment shown in FIG. 12A.

FIGS. 12A and 12B illustrate an example composite suspension component, in particular a leaf spring 6, having an arm 14 and first and second integrally formed, opposing eyes 20 26. Each is configured to receive a bushing for pivotal mounting to a chassis or frame member or shackle assembly. Leaf spring 6 has received multiple forms of Z axis reinforcement according to different aspects of the present disclosure.

In leaf spring 6 (FIGS. 12A-12B), resin 10 and elongated fibers 8 extend through a first portion 16 of arm 14 into a first portion 22 of a first eye 20 and through the first portion 16 of arm 14 into a first portion 28 of second eye 26, and through a second portion 18 of arm 14 into a second portion 24 of first eye 20 and through a second portion 18 of arm 14 into a second portion 30 of second eye 26. The elongated fibers 8 of leaf spring 6 are generally continuous, generally unidirectional and/or generally parallel.

In this example suspension component, the connection at the interface 9 between the first and second portions 16, 18 of arm 14 depends primarily on the bond strength of the resin rather than the strength of the elongated fibers 8.

Figure 9B:
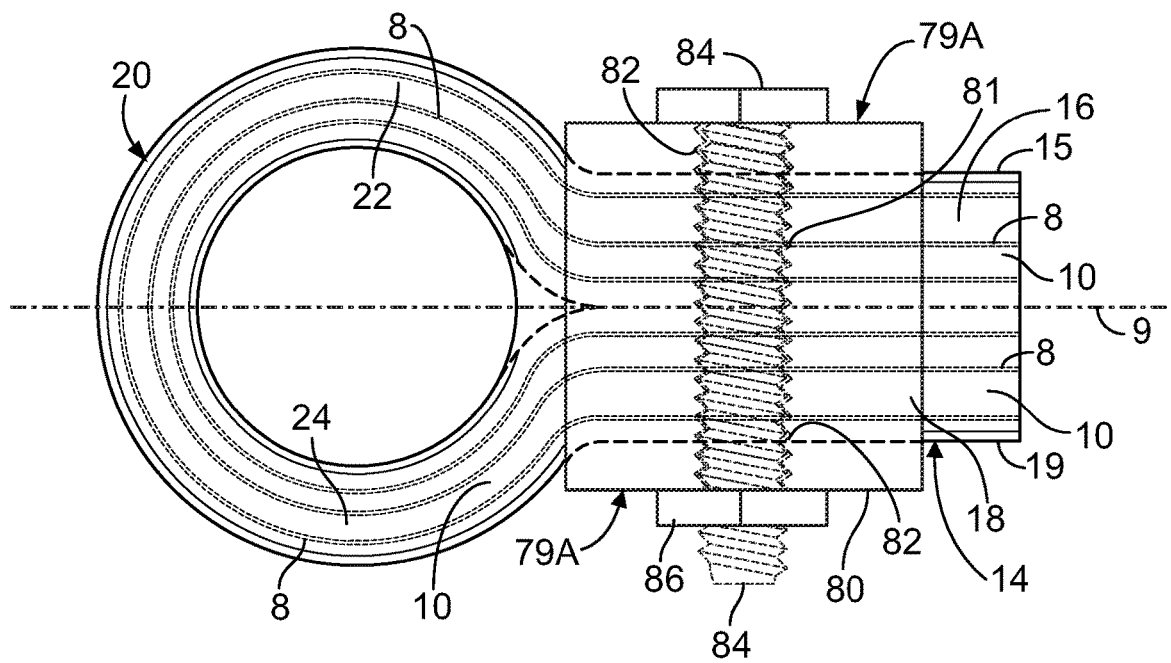
FIG. 9B is a schematic, cross sectional view of a portion of the embodiment shown in FIG. 9A.

Reinforcement of first and second eyes is achieved with the use of first and second plates to apply Z axis reinforcement, according to the present disclosure, adjacent the eyes, with the nearest edge of first and second plates generally in vertical alignment with the location along the X axis of arm 14 where first and second portions 16, 18 or their respective elongated fibers 8 diverge to form an eye (FIGS. 9A-9B).

Example stitching pattern 40 is applied midway between the seat of leaf spring 6 and each respective eye 20, 26 (FIGS. 12A-12B).

It will be appreciated any of the forms of Z axis reinforcement described and illustrated herein can be substituted for, or combined with one another, within the scope of the present disclosure. Accordingly, while first and second plates 80 are used adjacent each eye and stitching 40 is used further down arm 14 of leaf spring 6 (FIGS. 12A-12B), either form of Z axis reinforcement may substituted for or combined with one another at any of these locations.

Figure 13:
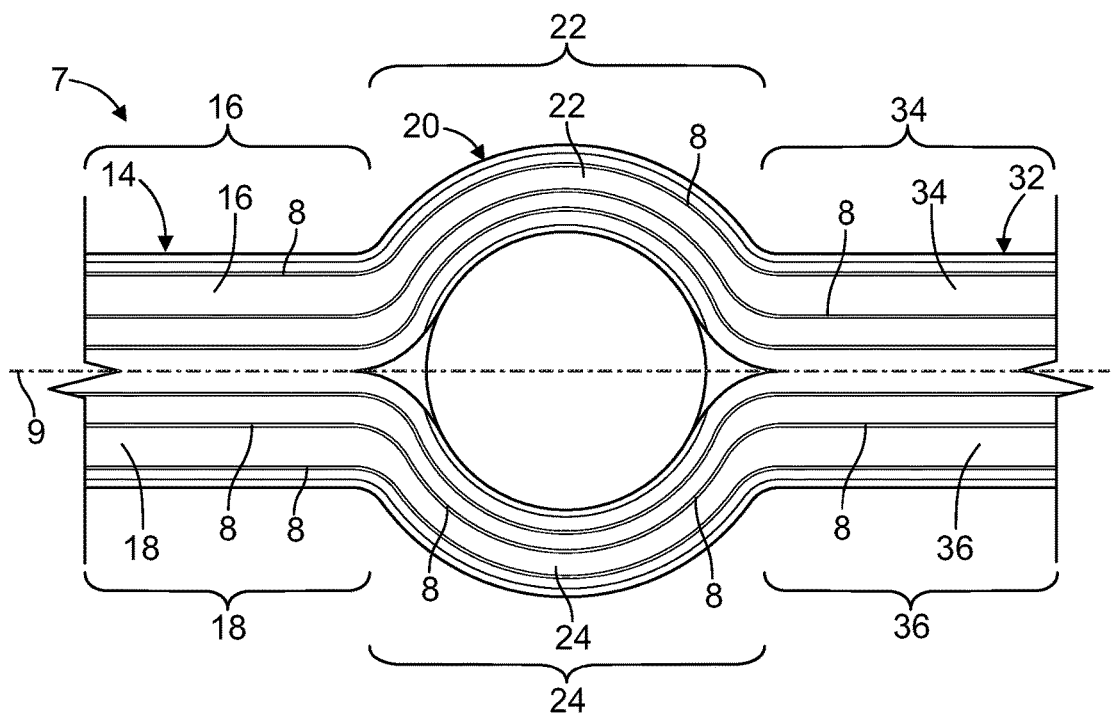
FIG. 13 is a schematic, side elevational view of a portion of a suspension component according to an aspect of the present disclosure.
Figure 14:
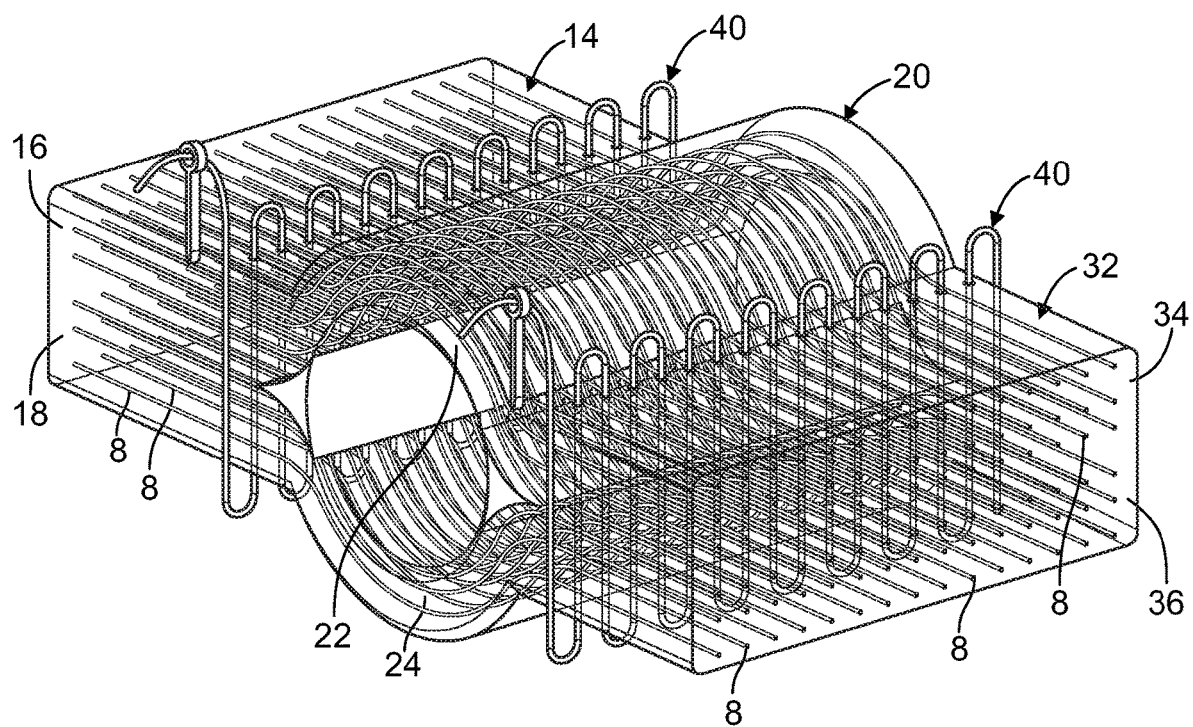
FIG. 14 is a schematic perspective view of a portion of the suspension component of FIG. 13 according to another aspect of the present the present disclosure.

FIGS. 13 AND 14 illustrates another suspension component that may receive Z axis reinforcement as described and illustrated herein. The suspension component 7 of FIG. 13 has a first eye 14 and integrally formed, first and second, generally opposing, arms 14, 32. Resin 10 containing elongated fibers 8 extend through a first portion 16 of first arm 14 into a first portion 22 of eye 20, and through a second portion (lower portion) 18 of first arm 14 into a second portion 24 of eye 20. Resin 10 containing elongated fibers 8 also extend through a first portion 34 of second arm 32 into a first portion of eye 20, and through a second portion 36 of second arm 32 into a second portion of eye 20. Elongated fibers 8 may be glass, carbon or other suitable structural fibers known to one skilled in the art of the present disclosure.

In the example suspension component (FIGS. 13-15), the connection at the interface 9 between the first and second portions (16, 18) in first arm 14 and between first and second portions (34, 36) in second arm depends primarily on the bond strength of resin rather than the strength of the elongated fibers 8.

Z axis reinforcement provides an appreciable benefit whether there is a tendency of uniquely shaped suspension component 7 to experience shear failure, either due to laminar shear along or near interface 9 resulting from the tension and compression sides of the arm wanting to move in opposite directions, or due to tensile shear resulting from the eye being forced into either arm when the eye and arm are placed under compression along their longitudinal axis.

Figure 15:
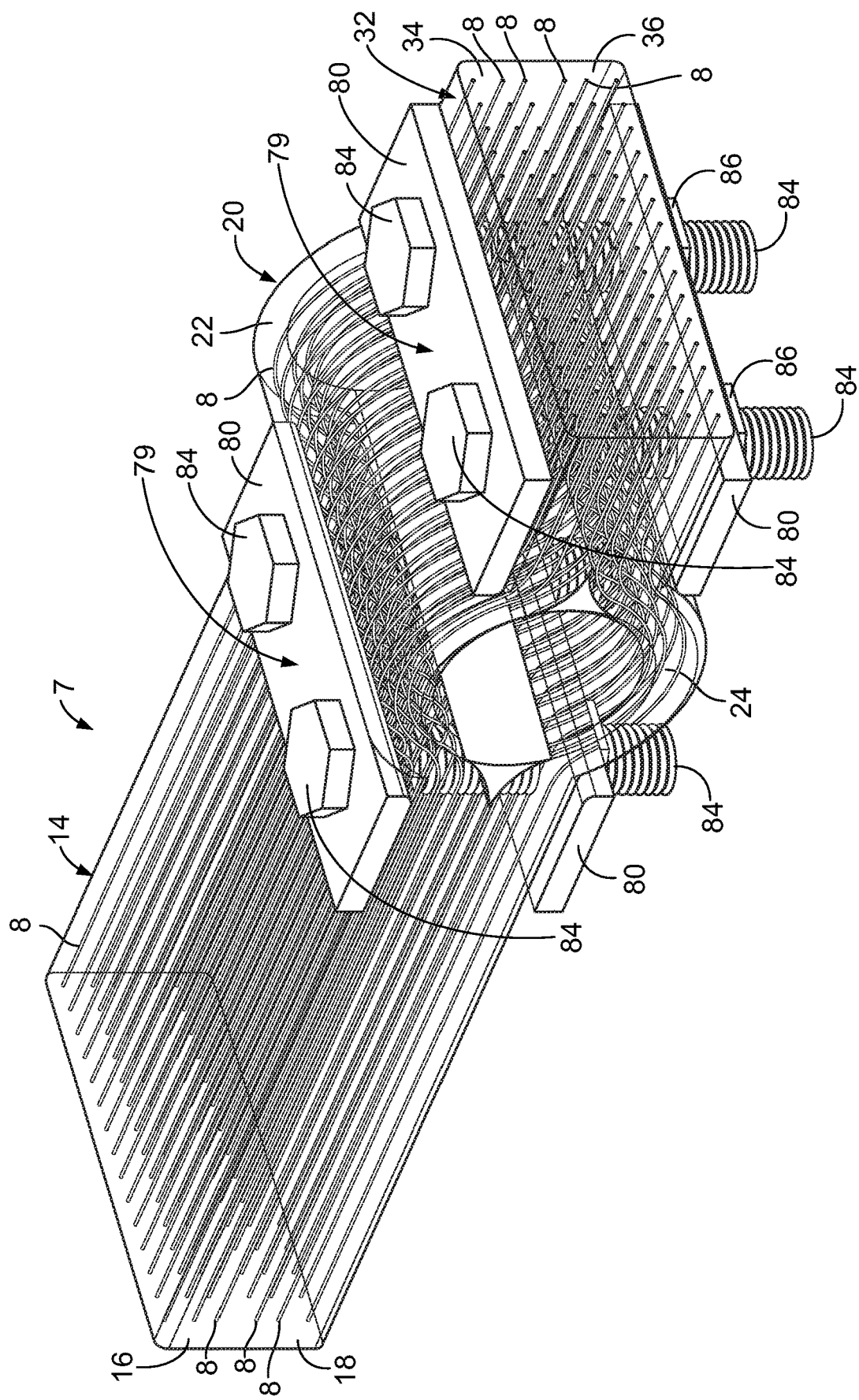
FIG. 15 is a schematic perspective view of a portion of the suspension component of FIG. 13 according to another aspect of the present the present disclosure.

FIGS. 14 AND 15 schematically illustrate aspects of Z axis reinforcement of the present disclosure incorporated into the suspension component of FIG. 13. The use of stitching (FIG. 14) and opposing plates (FIG. 15) in arm 14 to provide Z axis reinforcement is carried out in the same manner as previously described and illustrated herein. These forms of Z axis reinforcement can be provided adjacent the eye and/or elsewhere along the length of each arm 14, 32, without departing from the scope of the present disclosure.

Figure 16:
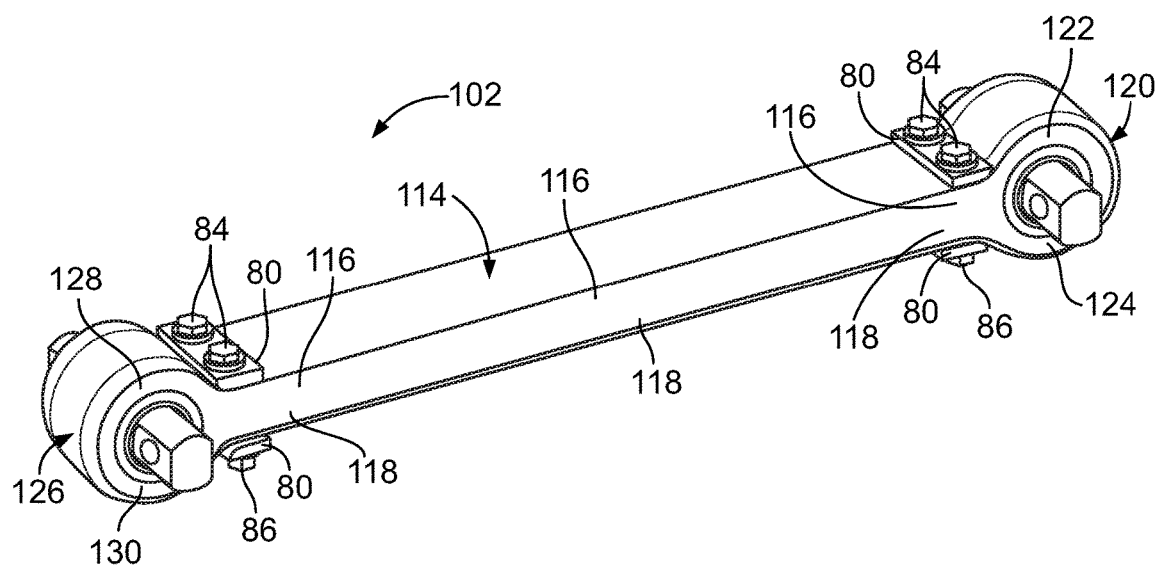
FIG. 16 is a perspective view of a transverse torque rod according to an aspect of the present disclosure.
Figure 17:
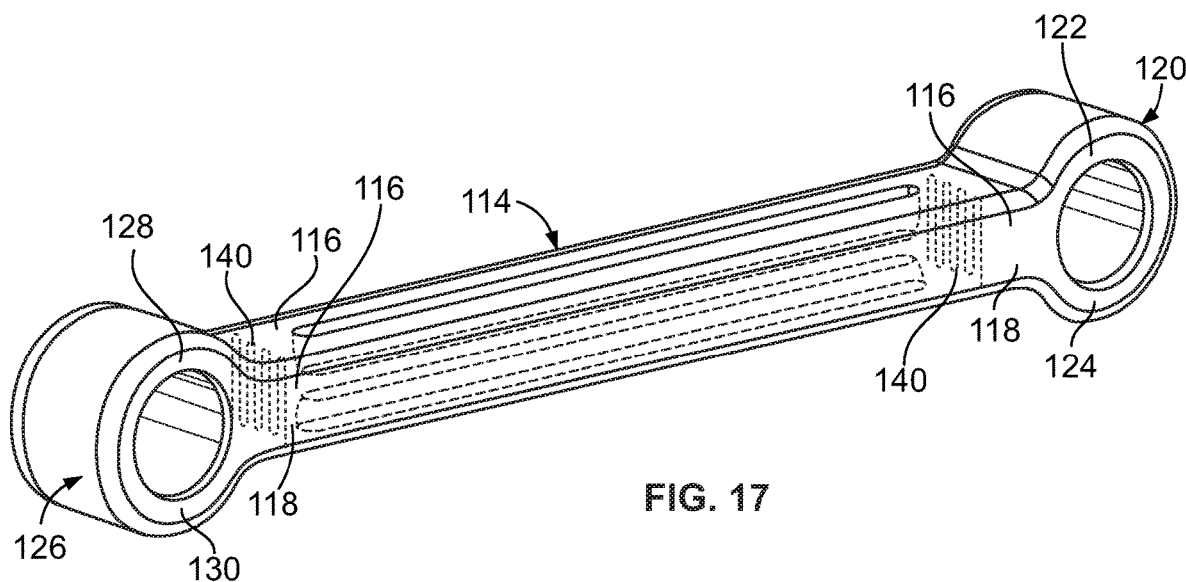
FIG. 17 is a perspective view of a transverse torque rod incorporating aspects of the present disclosure.

FIGS. 16 and 17 illustrate the incorporation of aspects of the present disclosure into a torque rod, which in the particular case is a transverse torque 102. The illustrated torque rods (FIGS. 16-17) incorporate different forms of Z axis reinforcement, as well as a further aspect of this disclosure, referred to herein as tunable compliance. Tunable compliance varies primarily the torsional and lateral stiffness, as desired. This feature in combination with the lower flex modulus of composite material reduce bushing stress thereby allowing for the use of smaller bushings and increased bushing life.

Example torque rod 102, prior to receiving the enhancements of Z axis reinforcement or tunable compliance, is manufactured using the same techniques used to manufacture the arm and eye component schematically illustrated in FIGS. 2-3. Accordingly, FIGS. 2-3 schematically illustrates the resin-elongated fiber construction of example torque rod 102, including arm 114 and eyes 120, 126.

Example torque rod 102 has an arm 114 and two integrated, opposing eyes or hubs 120, 126. The elongated fibers (not shown) of example torque rod 102 are generally continuous, generally unidirectional and/or generally parallel. The first and second portions of the arm extend generally in parallel to one another along the longitudinal axis of the arm. At each end of the arm, first and second portions of the arm extend or transition into corresponding first and second portions of each eye. Resin containing elongated fibers extend through first portion 116 of arm 114 into a first portion 122 of a first eye 120, and through a first portion 116 of arm 114 into a first portion 128 of a second eye 126, and through a second portion 118 of arm 114 into a second portion 124 of first eye 120, and through a second portion 118 of arm 114 into a second portion 130 of second eye 126.

Advantageously, Z axis reinforcement of the present disclosure may be incorporated in a torque rod to counteract against tensile shear which seeks to separate the first and second portions 116, 118 of arm 114 in the Z direction when compressive forces are directed through eye 120, 126 into the torque rod along its longitudinal axis. Opposing plates 80 (FIG. 16) with bolts 84 and connectors 86 or stitching 140 (FIG. 17) in arm 114 may provide Z axis reinforcement in the same manner as described and illustrated in other embodiments of the present disclosure.

Further, torque rod (FIG. 16) according to the present disclosure can optionally employ many of the fasteners described and illustrated herein at any location along the longitudinal axis of the arm. Opposing plates can be incorporated, at the arm 114, adjacent each eye 120, 126 to provide Z axis reinforcement to reinforce the connection between the first and second portions 116, 118 of the arm 114 to resist their separation from one another, to resist buckling in the arm, and/or to resist failure in an adjacent eye.

Figure 18A:
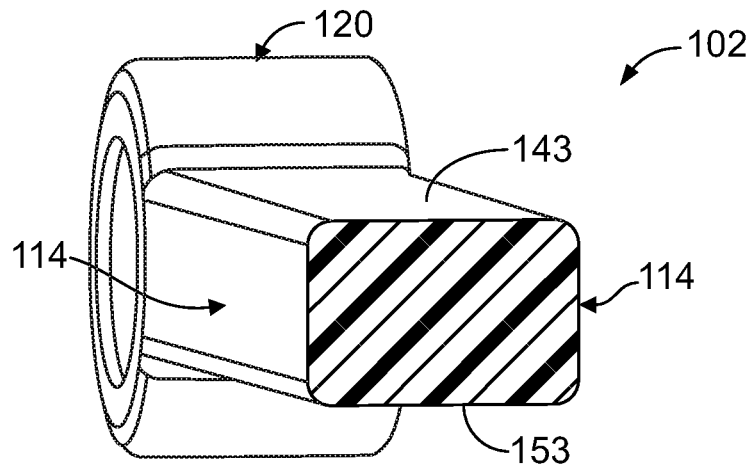
FIGS. 18A through 18C are perspective, cross sectional views of a portion of variously configured torque rods according to aspects of the present disclosure.
Figure 18B:
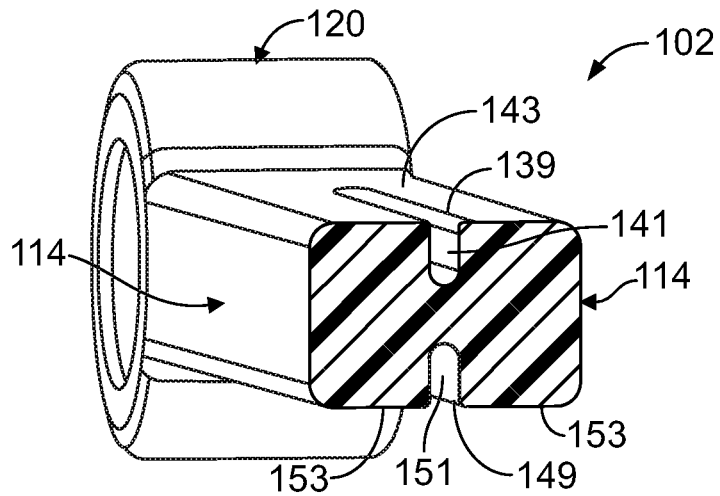
Figure 18C:
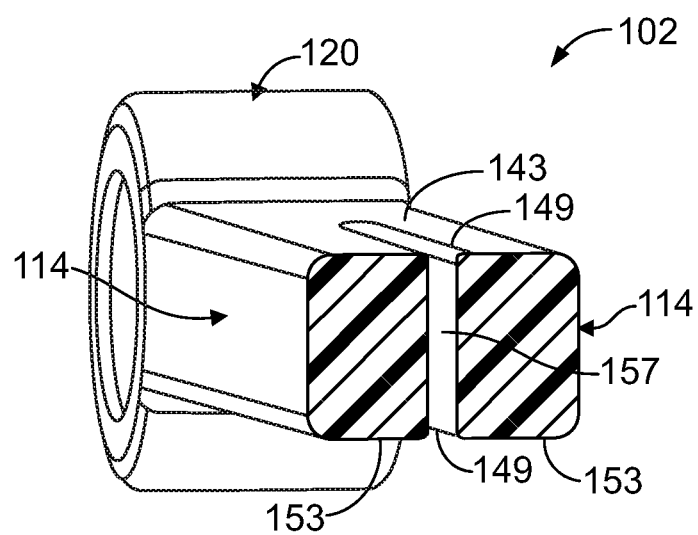

FIGS. 18A through 18C illustrates a tunable compliance feature which may be utilized in a suspension component contemplated by the present disclosure.

FIG. 18A illustrates one variant of the tunable compliance feature wherein the cross section of the arm is generally solid and therefore provides extremely high buckling strength, torsional and lateral stiffness. The arm 114 of the example torque rod shown in FIG. 15A is generally rectangular.

FIG. 18B illustrates another variant of the tunable compliance feature, which relative to FIG. 18A, has slightly less buckling strength and lateral stiffness and approximately half the torsional stiffness. In FIG. 18A, first and second exterior surfaces 143, 153 of the arm 114 define respective openings 139, 149, which are elongated and which extend inwardly from the first and second exterior surfaces 143, 153 of the arm 114 to define generally opposing, first and second grooves 141, 151. First and second grooves 141, 151 are generally perpendicular to the exterior surface from which they extend and to a central axis of either the first or second eye.

FIG. 18C illustrates yet another variant of the tunable compliance feature. The example torque of FIG. 18C has reduced or less lateral and torsional stiffness compared to the variants of FIGS. 18A and 18B. In FIG. 18C, first and second exterior surfaces 143, 153 of the arm 114 define respective openings 139, 149, which are elongated and which define a slot 157 extending through the arm from the first exterior surface 143 to the second exterior surface 153. The slot 157 is generally perpendicular to the first and second exterior surfaces 143, 153 and to a central axis of the first or second eye.

As best shown in FIGS. 18B and 18C, it may also be observed that in a transverse cross section of the arm of a composite suspension component receiving tunable compliance as described and illustrated herein, the aggregate cross sectional area of any of the previously described grooves or slots may be less than the aggregate cross section area occupied by the material of construction of the arm.

It should be understood that the example torque rod cross sections illustrated in FIGS. 18A-18C are merely exemplary and differently shaped torque rods may be employed, without departing from the scope of the present disclosure. By way of example and not limitation, the depth and width of the grooves can be modified to render the torque rod more compliant laterally and torsionally while minimizing the reduction in buckling strength.

It will be understood that the embodiments described above are illustrative of some of the applications of the principles of the present subject matter. Numerous modifications may be made by those skilled in the art without departing from the spirit and scope of the claimed subject matter, including combinations of features that are individually disclosed or claimed herein. For these reasons, the scope of this disclosure is not limited to the above description but is as set forth in the following claims, and it is understood that claims may be directed to the features hereof, including as combinations of features that are individually disclosed or claimed herein.

We claim:

1. A vehicle suspension component comprising:
    a first arm and a first eye, each having a first portion and a second portion
    said first arm and said first eye being connected and formed of a resin, said resin containing a plurality of elongated fibers, said resin and said plurality of elongated fibers extending through said first portion of said first arm into said first portion of said first eye, and through said second portion of said first arm into said second portion of said first eye;
    said first and second portions of said first arm being joined together to form a bond between said first and second portions of said first arm;
    wherein a first fastener is a clamp positioned at or adjacent to said first eye, said clamp comprising a first plate, a second plate and a clamp arm that operatively connects said first plate and said second plate, said first plate and said second plate, respectively, engaging a top surface and a bottom surface of said first arm of said vehicle suspension component;
    wherein said first plate or said second plate includes an extension, said extension having a generally arcuate shape and extending at least partially around an outer surface of said first eye, said first eye positioned between a portion of said extension and said first arm; and
    wherein the first fastener associated with said first arm connects said first and second portions of said first arm together to reinforce said first eye, or to reinforce the bond between said first and second portions of the first arm or the first eye or to resist their separation from one another.

2. The vehicle suspension component of claim 1, wherein the suspension component is a leaf spring.

3. The vehicle suspension component of claim 1 wherein the suspension component is a torque rod.

4. The vehicle suspension component of claim 3 wherein the torque rod is a transverse torque rod.

5. The vehicle suspension component of claim 3 wherein the first arm further comprises a first exterior surface defining a first opening in said arm.

6. The vehicle suspension component of claim 1 wherein said first arm and said first eye are integrally formed of said resin containing a plurality of elongated fibers.

7. The vehicle suspension component of claim 1, further comprising a second eye, said second eye having a first portion and a second portion;
    said first arm and said second eye being connected and formed of said resin containing said plurality of elongated fibers;
    said resin and said elongated fibers extending through said first portion of said first arm into said first portion of said second eye and through said second portion of said arm into said second portion of said second eye;
    wherein a second fastener associated with said first arm connects said first and second portions of said first arm together to reinforce said second eye, or to reinforce the bond between said first and second portions of the first arm or the second eye or to resist their separation from one another.

8. The vehicle suspension component of claim 7, said first arm, said first eye and said second eye being integrally formed of said resin containing said plurality of elongated fibers.

9. The vehicle suspension component of claim 1 wherein the first arm is generally solid.

10. The vehicle suspension component of claim 1 wherein a transverse cross section of said first arm is rectangular.

11. The vehicle suspension component of claim 1 wherein said arm is generally non-cylindrical in shape.

12. The vehicle suspension component of claim 1 wherein said plurality of elongated fibers are generally parallel to one another or are generally continuous or are unidirectional.

13. The vehicle suspension component of claim 7 wherein a third fastener associated with said first arm is positioned at said first arm and between the first eye and the second eye and connects said first and second portions of said first arm together to reinforce the connection or bond between said first and second portions of said first arm, or to resist their separation from one another or to resist buckling in said first arm.

14. The vehicle suspension component of claim 1 wherein said first fastener is positioned at said first arm and adjacent said first eye to reinforce said first eye or to resist the opening of said first eye.

15. The vehicle suspension component of claim 1 wherein said first fastener extends through said first and second portions of said first arm in a direction that is generally perpendicular to a longitudinal axis of said first arm or to the central axis of said first eye.

16. The vehicle suspension component of claim 7 wherein said second fastener is positioned at said first arm and adjacent said second eye to resist the opening of said second eye.

17. The vehicle suspension component of claim 16 wherein said second fastener extends through said first and second portions of said first arm in a direction that is generally perpendicular to a longitudinal axis of said first arm or to the central axis of said second eye.

18. The vehicle suspension component of claim 5 wherein said first opening of said first exterior surface is elongated.

19. The vehicle suspension component of claim 18 wherein said first opening transitions into a first groove that extends into said arm.

20. The vehicle suspension component of claim 19 wherein said first groove extends longitudinally between said first eye and said second eye.

21. The vehicle suspension component of claim 19, wherein said first groove extends inwardly from said first exterior surface in a direction that is perpendicular to a central axis of said first eye.

22. The vehicle suspension component of claim 19, wherein said first groove extends inwardly from said first exterior surface in a direction that is generally perpendicular to said first exterior surface.

23. The vehicle suspension component of claim 19, wherein said first arm further comprises a second exterior surface defining a second opening, and said second opening is elongated.

24. The vehicle suspension component of claim 23 wherein said second opening transitions into a second groove that extends into said arm.

25. The vehicle suspension component of claim 24 wherein said second groove extends longitudinally between said first eye and said second eye.

26. The vehicle suspension component of claim 23, wherein said second groove extends inwardly from said second exterior surface in a direction that is perpendicular to a central axis of said first eye.

27. The vehicle suspension component of claim 23, wherein said second groove extends inwardly from said second exterior surface in a direction that is generally perpendicular to said second exterior surface.

28. The vehicle suspension component of claim 23, wherein said first and second grooves extend into said first arm in alignment with or in parallel with one another.

29. The vehicle suspension component of claim 23 wherein said first opening of said first exterior surface and said second opening of said second exterior surface transition into a slot extending through said first arm from the first exterior surface to the second exterior surface.

30. The vehicle suspension component of claim 29 wherein said slot extends in a direction that is generally perpendicular to said first exterior surface, said second exterior surface or both.

31. The vehicle suspension component of claim 29 wherein said slot extends in a direction that is generally perpendicular to the central axis of said first eye or said second eye.

32. The vehicle suspension component of claim 29 wherein said first and second exterior surfaces are nonadjacent or are on opposite sides of said arm.

33. The vehicle suspension component of claim 32, wherein a transverse cross section of the first arm defines a void portion corresponding to an aggregate cross sectional area of any said groove or said slot in said transverse cross section, and a solid portion corresponding to an aggregate cross sectional area of said transverse cross section occupied by the material of construction of said first arm, and wherein the cross sectional area of said void portion is less than that of said solid portion.

34. The vehicle suspension component of claim 33, wherein the cross sectional area of said void portion is less than that of said solid portion at each transverse cross section of said first arm taken along the entire length of said first arm where any said groove or said slot is present.

35. The vehicle suspension component of claim 1 wherein a second fastener comprises a stitch; and wherein said second fastener associated with said first arm connects said first and second portions of said first arm together to reinforce said first eye, or a second eye, or to reinforce the bond between said first and second portions of the first arm or the second eye or to resist their separation from one another.

36. The vehicle suspension component of claim 35, wherein said second fastener comprises a plurality of stitches, said plurality of stitches bundling a plurality of elongated fibers of said first and second portions of said first arm.

37. The vehicle suspension component of claim 36 wherein said plurality of stitches of said second fastener are wavelike in shape.

38. The vehicle suspension component of claim 36 wherein two or more stitches of said plurality of stitches of said second fastener are substantially similar in shape.

39. The vehicle suspension component of claim 36 wherein two or more stitches of said plurality of stitches of said second fastener comprise vertically disposed stitches and horizontally disposed stitches, said vertically disposed stiches overlapping with said horizontally disposed stitches, forming a matrix extending in the vertical and horizontal directions which are perpendicular to the longitudinal axis of the vehicle suspension component.

40. The vehicle suspension component of claim 36 wherein two or more stitches of said plurality of stitches of said second fastener intersect or loop with an adjacent stitch of said plurality of stitches.

41. The vehicle suspension component of claim 36 wherein said plurality of stitches of said second fastener bundling elongated fibers in successively larger bundles.

42. The vehicle suspension component of claim 36 wherein successive stitches of said plurality of stitches of said second fastener vary in width or in height.

43. The vehicle suspension component of claim 1 comprising a second fastener and a third fastener, each of said second and third fasteners associated with said first arm and comprising a plurality of stitches, each plurality of stitches bundling a plurality of elongated fibers of said first and second portions of said first arm and forming a discrete row extending laterally across said arm and being spaced apart from one another in the longitudinal direction along the length of said first arm.

44. The vehicle suspension component of claim 36 wherein the material of composition of said plurality of stitches is different from that of said plurality of elongated fibers.

45. The vehicle suspension component of claim 36 wherein the material of composition of said plurality of stitches is substantially similar to that of said plurality of elongated fibers.

46. The vehicle suspension component of claim 1, wherein said first clamp plate is integrally formed with said second clamp plate.

47. The vehicle suspension component of claim 1, said clamp arm comprising a threaded shaft having a head, and a connector configured to receive said threaded shaft,
- said suspension component arm defines a bore extending through the suspension component arm and the top and bottom surface thereof,
- said first plate and said second plate each define a bore and engagement surfaces adjacent said bore,
- wherein the first plate, the suspension component arm and the second plate are positioned to place their respective bores in registration with one another; said threaded shaft is positioned to extend through the respective bores and is by said connector, such that when said connector is tightened, said first plate and said second plate apply and maintain pressure on said top and bottom surfaces of said suspension component.

48. The vehicle suspension component of claim 1, wherein said first plate and said second plate are discrete and separately formed.

49. The vehicle suspension component of claim 1 wherein said first plate includes said extension and presents a distal end that extends laterally across the outer surface of said eye and that is spaced away from said second plate.

50. The vehicle suspension component of claim 1, wherein said extension is positioned on the outer surface of said eye.

51. The vehicle suspension component of claim 1, wherein said first plate includes the extension, said extension presenting a distal end of said first plate, said first eye positioned between said distal end of said first plate and said first arm.

52. The vehicle suspension component of claim 1 wherein said extension extends entirely around the outer surface of said first eye.

* * * * *